(12) United States Patent
Wako et al.

(10) Patent No.: US 9,016,441 B2
(45) Date of Patent: Apr. 28, 2015

(54) LINEAR STOPPER

(71) Applicant: Talk System Co., Ltd., Tokyo (JP)

(72) Inventors: Shigeru Wako, Tokyo (JP); Yoshikazu Komiya, Tokyo (JP)

(73) Assignee: Talk System Co., Ltd., Tokyo (JP)

( * ) Notice: Subject to any disclaimer, the term of this patent is extended or adjusted under 35 U.S.C. 154(b) by 0 days.

(21) Appl. No.: 14/079,869

(22) Filed: Nov. 14, 2013

(65) Prior Publication Data

US 2014/0131145 A1    May 15, 2014

Related U.S. Application Data

(63) Continuation of application No. 13/519,197, filed as application No. PCT/JP2010/073800 on Dec. 28, 2010, now Pat. No. 8,616,343.

(30) Foreign Application Priority Data

Dec. 28, 2009   (JP) .................................. 2009-298909
Nov. 18, 2010   (JP) .................................. 2010-257847

(51) Int. Cl.
  *B65H 59/10*   (2006.01)
  *F16D 63/00*   (2006.01)
  *F16B 2/16*    (2006.01)
  (Continued)

(52) U.S. Cl.
  CPC ................ *F16D 63/008* (2013.01); *F16B 2/16* (2013.01); *F16C 29/02* (2013.01); *F16C 29/04* (2013.01); *F16C 29/10* (2013.01)

(58) Field of Classification Search
  USPC ............ 188/67, 129, 134, 265; 92/17, 24, 28; 384/537
  See application file for complete search history.

(56) References Cited

U.S. PATENT DOCUMENTS 2,865,688 A   12/1958   LeMont, Jr.
3,655,251 A   4/1972   Evenson
(Continued)

FOREIGN PATENT DOCUMENTS

GB   2 134 966 A   8/1984
JP   35-003869 Y1   3/1960
(Continued)

OTHER PUBLICATIONS

Japanese Office Action (Application No. 2013-273132) dated Aug. 12, 2014 (with English translation).
(Continued)

*Primary Examiner* — Christopher Schwartz
(74) *Attorney, Agent, or Firm* — Burr & Brown, PLLC

(57) ABSTRACT

A linear stopper including a stopper body having an inclined surface with a wedge-like space between the inclined surface and a surface of the guide member with a gap decreasing gradually toward one side of an extending direction of the guide member; rolling elements that are arranged in the wedge-like space so as to be rollable therein; and rolling element pressing means that presses the rolling elements in a direction to bite into the wedge-like space, so that the rolling elements are forced into pressure contact with the surface of the guide member and the inclined surface of the stopper body. A one-way stopper mechanism restricts the relative movement of the stopper body with respect to the guide member toward a side at which the gap in the wedge-like space is large, but allows the relative movement toward a side at which the gap in the wedge-like space is small.

11 Claims, 17 Drawing Sheets

(51) Int. Cl.
  *F16C 29/02* (2006.01)
  *F16C 29/04* (2006.01)
  *F16C 29/10* (2006.01)

(56) References Cited

U.S. PATENT DOCUMENTS

| | | | |
|---|---|---|---|
| 3,684,303 | A | 8/1972 | Serra |
| 3,918,346 | A | 11/1975 | Ziegler |
| 4,557,613 | A | 12/1985 | Tallian et al. |
| 4,705,411 | A | 11/1987 | Kellstrom |
| 2,925,289 | A | 2/1990 | Brown, Jr. et al. |
| 5,230,406 | A | 7/1993 | Poon |
| 5,441,351 | A | 8/1995 | Grunze |
| 5,988,342 | A | 11/1999 | Ito et al. |
| 6,007,268 | A | 12/1999 | Whittington et al. |
| 6,178,870 | B1 | 1/2001 | Takahashi |
| 6,186,047 | B1 | 2/2001 | Baruffaldi |
| 6,499,568 | B1 | 12/2002 | Nemeth |
| 7,261,031 | B2 | 8/2007 | Hama |
| 8,616,343 | B2 * | 12/2013 | Wako et al. ............ 188/67 |
| 2002/0131661 | A1 | 9/2002 | Johnson et al. |

FOREIGN PATENT DOCUMENTS

| | | |
|---|---|---|
| JP | 51-083576 U | 7/1976 |
| JP | 58-052319 U | 4/1983 |
| JP | 59-108819 U | 7/1984 |
| JP | 07-119739 A1 | 5/1995 |
| JP | 07-279919 A1 | 10/1995 |
| JP | 11-004508 | 1/1999 |
| JP | 2002-266860 | 9/2002 |
| JP | 2003-148463 A1 | 5/2003 |
| JP | 2005-325943 | 11/2005 |
| JP | 2008-032047 A1 | 2/2008 |
| JP | 2009-006458 A1 | 1/2009 |

OTHER PUBLICATIONS

Korean Office Action (Application No. 10-2014-7001752) dated Apr. 1, 2014.
Japanese Office Action (Application No. 2013-273131) dated Sep. 2, 2014 (with English translation).
International Search Report dated Feb. 1, 2011.
Japanese Office Action, Japanese Application No. 2011-547735, dated Jun. 3, 2014 (3 pages).
U.S. Office Action (U.S. Appl. No. 14/079,879) dated Dec. 24, 2014.

* cited by examiner

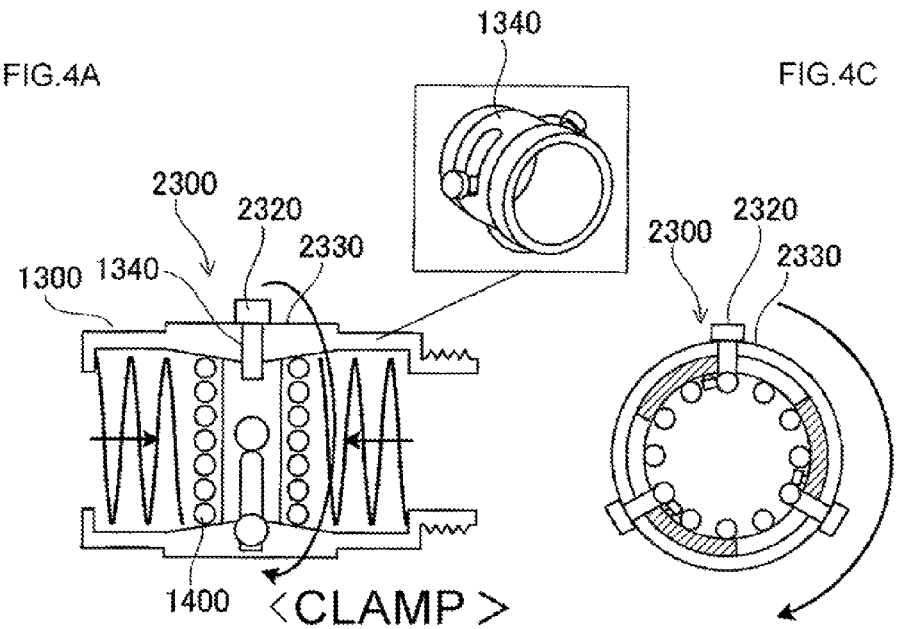
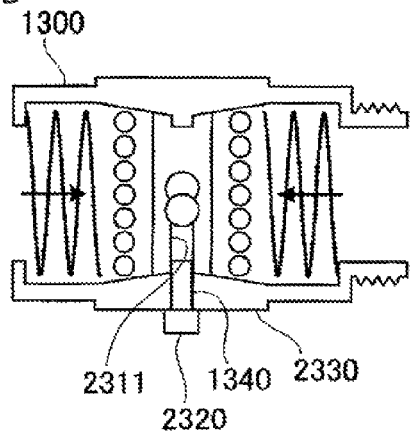
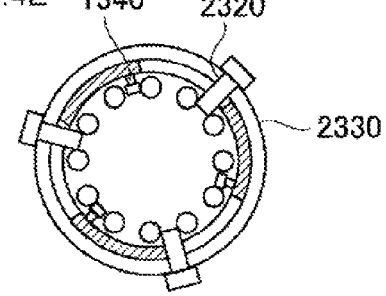

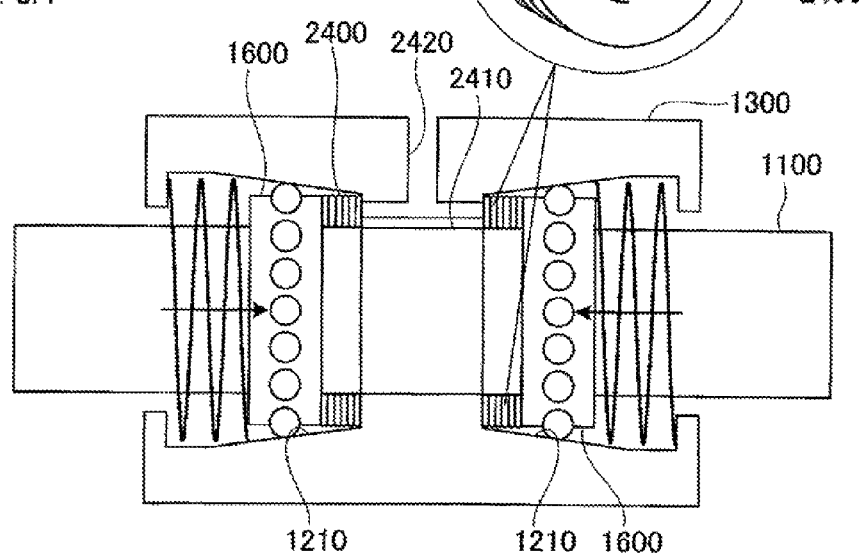
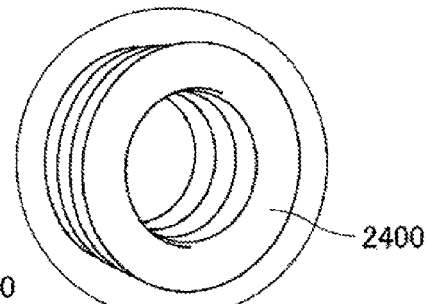
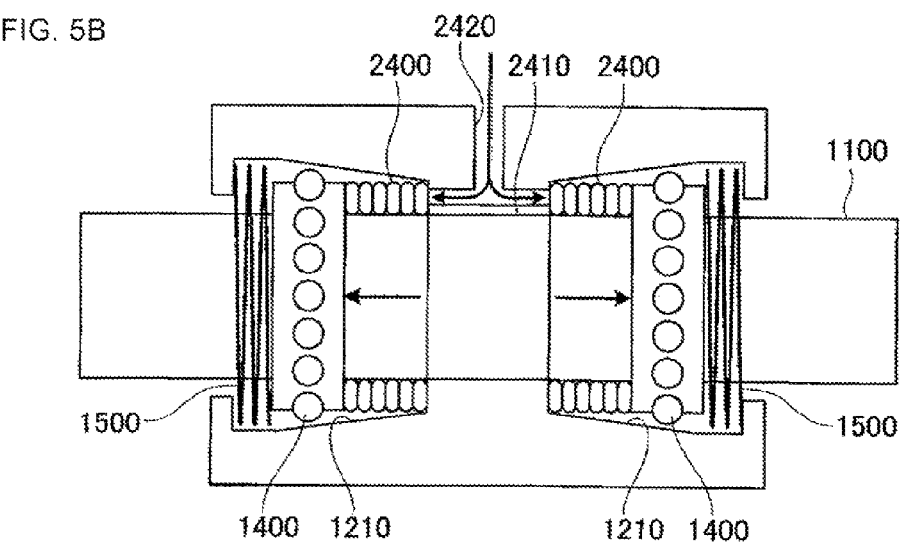

《 UN CLAMP 》

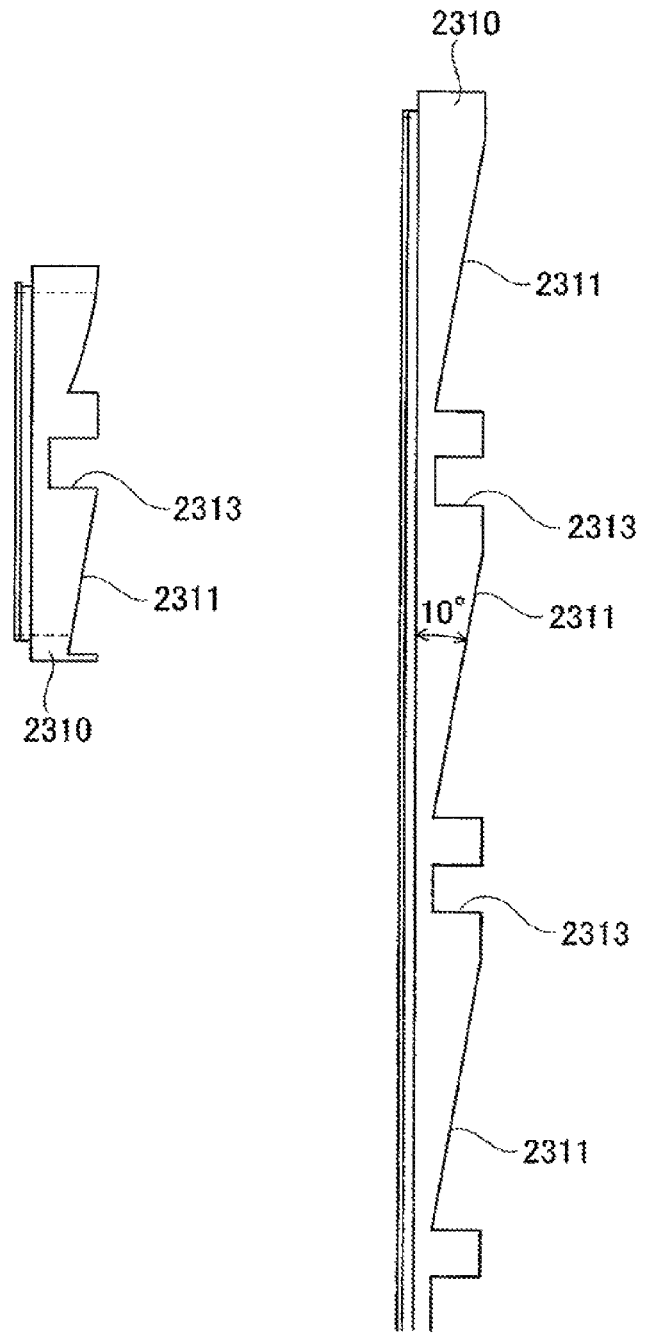

LINEAR STOPPER

CROSS REFERENCE TO RELATED APPLICATIONS

This application is a continuation of U.S. application Ser. No. 13/519,197, filed Oct. 18, 2012, which was the National Stage of International Application No. PCT/JP2010/073800, filed Dec. 28, 2010, and claims the benefit under 35 USC §119(a)-(d) of Japanese Patent Application Nos. 2009-298909 and 2010-257847 filed Dec. 28, 2009 and Nov. 18, 2010, respectively, the entireties of which are incorporated herein by reference.

FIELD OF THE INVENTION

The present invention relates to a linear stopper which is mounted on an arbitrary position of a guide member extending in a rectilinear manner or in a curved line manner, and which serves to restrict the movement of an object guided by means of a guide member.

BACKGROUND OF THE INVENTION

Such a kind of conventional stopper is constructed such that a stopper member is pushed by a spring force of a spring so that it is fixed by a frictional force. However, the force of a spring is weak. Accordingly, there has been known a stopper which is controlled by air pressure, etc., but this stopper is large in size and complicated in control as well. Here, note that as a similar technique, there is one as described in Japanese Patent Application Laid-Open No. 2009-006458, for example.

SUMMARY OF THE INVENTION

The present invention has been made so as to solve the problems of the conventional techniques as referred to above, and the object of the present invention is to provide a simple linear stopper which is capable of stopping the movement of an object in a reliable manner with a simple structure.

In order to achieve the above-mentioned object, the present invention comprises: a stopper body that is adapted to be detachably mounted on a guide member extending in a linear manner so as to guide an object for reciprocating movement, and has an inclined surface formed thereon, with a wedge-like space being constructed between the inclined surface and a surface of the guide member with a gap decreasing gradually toward one side of an extending direction of the guide member; rolling elements that are arranged in the wedge-like space so as to be rollable therein; and rolling element pressing means that presses the rolling elements in a direction to bite into the wedge-like space, so that the rolling elements are forced into pressure contact with the surface of the guide member and the inclined surface of the stopper body; wherein a one-way stopper mechanism is provided which restricts the relative movement of the stopper body with respect to the guide member toward a side at which the gap in the wedge-like space is large, due to a biting action caused by the rolling contact of the rolling elements in the wedge-like space, and allows the relative movement of the stopper body with respect to the guide member toward a side at which the gap in the wedge-like space is small, due to the sliding contact of the rolling elements in the wedge-like space.

It is preferable that the stopper body be provided with a reaction force support part which is in engagement with the guide member to support a reaction force acting on the inclined surface from the rolling elements upon biting thereof into the wedge-like space at the time of restriction of the relative movement of the stopper body.

In addition, it is also preferable that rolling element release means be provided which serves to force the rolling elements arranged in a wedge-like space to move in a direction in which the gap in the wedge-like space becomes larger, whereby the stopper body is allowed to move relative to the guide member toward the side at which the gap in the wedge-like space is larger.

Moreover, it is also preferable that at least one pair of one-way stopper mechanisms be provided in which the directions of wedge-like spaces with respect to the guide member become mutually opposite to each other, so that the relative movement of the stopper body with respect to the guide member in the opposite directions of the reciprocating movement thereof can be restricted, and that rolling element release means be provided which serves to force the rolling elements arranged in the wedge-like space of at least one of the one-way stopper mechanisms to move in a direction in which the gap in the wedge-like space becomes larger, whereby the stopper body is allowed to move relative to the guide member toward the side at which the gap in the wedge-like space is larger.

According to a linear stopper of the present invention, with a simple construction in which the rolling elements are arranged for free rolling movement in the wedge-like space formed between the inclined surface of the stopper body and the guide member, it is possible to restrict the relative movement of the stopper body with respect to the guide member due to the biting action caused by the rolling contact of the rolling elements in the wedge-like space.

In addition, because the rolling elements are in point contact or line contact, with respect to the movement thereof in an opposed direction, it is possible to release the rolling elements bitten into the wedge-like space therefrom in an easy manner.

BRIEF DESCRIPTION OF THE DRAWINGS

FIGS. 4A-4E are views showing the schematic construction of a ring type release mechanism which is applied to the linear stopper of the present invention.

FIGS. 5A-5C are views showing the schematic construction of an air type release mechanism which is applied to the linear stopper of the present invention.

FIGS. 6A-6D show the schematic construction of a linear stopper according to a first embodiment of the present invention, wherein FIGS. 6A and 6B are perspective views, FIG. 6C is a front elevational view, and FIG. 6D is a side elevational view.

FIGS. 7A and 7B show the detailed construction of the linear stopper of FIG. 6, wherein FIG. 7A is a front elevational cross sectional view, and FIG. 7B is a side elevational view.

FIGS. 8A and 8B show a roller used for the linear stopper of FIG. 7, wherein FIG. 8A is a front elevational view, and FIG. 8B is a side elevational view.

FIGS. 9A and 9B show an example of a roller guide device using the roller of FIG. 8, wherein FIG. 9A is a front elevational view, and FIG. 9B is a side elevational cross sectional view.

FIGS. 10A-10D show the schematic construction of a linear stopper according to a second embodiment of the present invention, wherein FIGS. 10A and 10B are perspective views, FIG. 10C is a front elevational view, and FIG. 10D is a side elevational view.

FIGS. 11A-11E show the detailed construction of the linear stopper of FIG. 10, wherein FIG. 11A is a front elevational view, FIG. 11B is a plan cross sectional view, FIG. 11C is a front elevational cross sectional view, FIG. 11D is a side elevational view, and FIG. 11E is a bottom view.

FIGS. 12A-12D show the schematic construction of a linear stopper according to a third embodiment of the present invention, wherein FIGS. 12A and 12B are perspective views, FIG. 12C is a front elevational view, and FIG. 12D is a side elevational view.

FIGS. 13A and 13B show the detailed construction of the linear stopper of FIG. 12, wherein FIG. 13A is a front elevational cross sectional view, and FIG. 13B is a side elevational view.

FIGS. 15A and 15B show a slide cam of FIG. 13, wherein FIG. 15A is a front elevational view, and FIG. 15B is a development view.

FIGS. 16A-16C show a linear stopper according to a fourth embodiment of the present invention, wherein FIG. 16A is a front elevational cross sectional view, FIG. 16B is a cross sectional view along line B-B in FIG. 16A, and FIG. 16C is a cross sectional view along line B-B in FIG. 16B.

DETAILED DESCRIPTION OF THE INVENTION

Figure 1A:
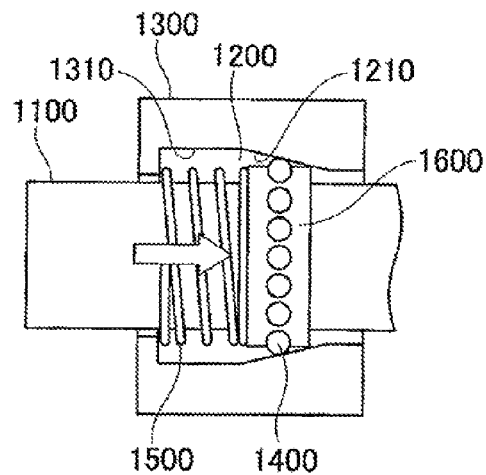
FIGS. 1A-1D are views showing the principle construction of a linear stopper of the present invention.

Hereinafter, embodiments of the present invention will be described in detail with reference to the accompanying drawings.

Basic Construction

In FIG. 1, there is shown the basic construction of a linear stopper of the present invention.

Specifically, the linear stopper is provided with: a stopper body 1300 that is adapted to be detachably mounted on a guide member 1100 extending in a linear manner so as to guide an unillustrated object for reciprocating movement, and has a tapered surface 1210, which is an inclined surface constituting a wedge-like space 1200, formed between the inclined surface and a surface of the guide member 1100 with a gap decreasing gradually toward one side of the extending direction of the guide member 1100; rolling elements 1400 that are arranged in the wedge-like space so as to be rollable therein; and a rolling element pressing mechanism 1500 that presses the rolling elements 1400 in a direction to bite into the wedge-like space 1200, so that the rolling elements 1400 are forced into pressure contact with the surface of the guide member 1100 and the tapered surface 1210 of the stopper body 1300.

This mechanism constitutes a one-way stopper mechanism that restricts the relative movement of the stopper body 1300 with respect to the guide member 1100 toward a side at which the gap of the wedge-like space 1200 is large, due to a biting action caused by the rolling contact of the rolling elements 1400 in the wedge-like space 1200, and allows the relative movement of the stopper body 1300 with respect to the guide member 1100 toward a side at which the gap of the wedge-like space 1200 is small, due to the sliding contact of the rolling elements 1400 in the wedge-like space 1200.

Although in the illustrated example, the guide member 1100 is composed of a round shaft having a circular cross section, it may not be the round shaft, but may instead be a shaft of a polygonal shape in cross section, or may be of a shaft construction with an irregular shape cross section.

The stopper body 1300 is a block body of a closed cross sectional structure which is provided with a through hole 1310 through which the guide member 1100 is inserted, and the stopper body 1300 is provided on an inner periphery of the through hole 1310 with the tapered surface 1 which forms the wedge-like space 1200 between itself and an outer peripheral surface of the guide member 1100. In the illustrated example, the through hole 1310 has a circular cross section corresponding to the round shaft.

Although in the illustrated example, the rolling element pressing mechanism 1500 is exemplified as a coil spring, it is not limited to this, but may be any other thing which can just urge the rolling elements 1400 in a direction to be pushed into the wedge-like space 1200.

The rolling elements 1400 are arranged in plurality in a circumferential direction of the guide member 1100 at a predetermined interval, and are held in a freely rotatable manner by means of a retainer 1600 which is a rolling element cage. In the illustrated example, balls are exemplified as the rolling elements 1400, but the rolling elements are not limited to balls, but may be rollers. As for the shape of the rollers, rollers in the form of various shapes, such as barrel shaped rollers, hand-drum shaped rollers, etc., can also be applied or used.

In addition, a release mechanism 2000 acting as rolling element release means is provided which serves to force the rolling elements 1400 arranged in the wedge-like space 1200 to move in a direction in which the gap in the wedge-like space 1200 becomes larger, whereby the stopper body 1300 is allowed to move relative to the guide member 1100 toward the side at which the gap in the wedge-like space 1200 is larger.

As the release mechanism, various forms of ones can be adopted, but in the following, reference will be made to those of a lever type, a plate type, a ring type, and an air type, from the form of an operation part.

Construction of Lever Type Release Mechanism

Figure 2A:
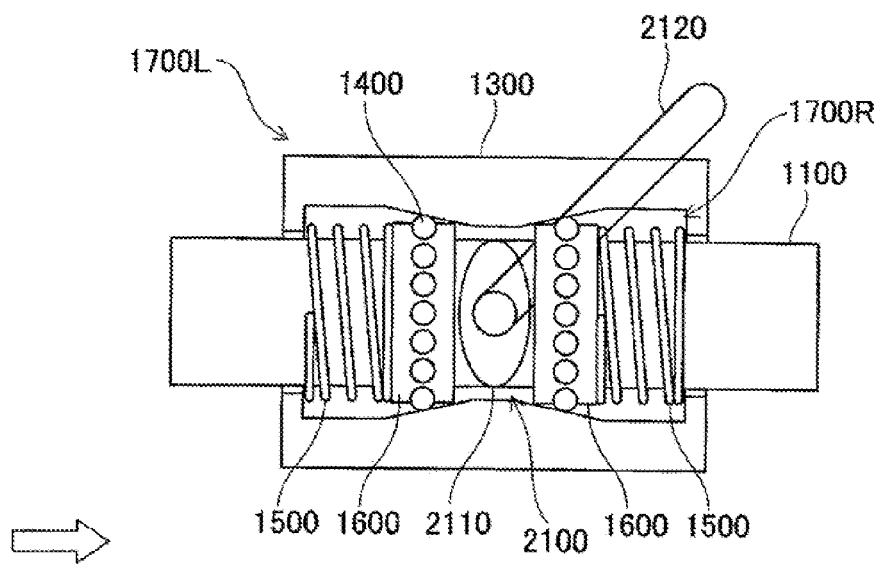
FIGS. 2A and 2B are views showing the schematic construction of a lever type release mechanism which is applied to the linear stopper of the present invention.
Figure 2B:
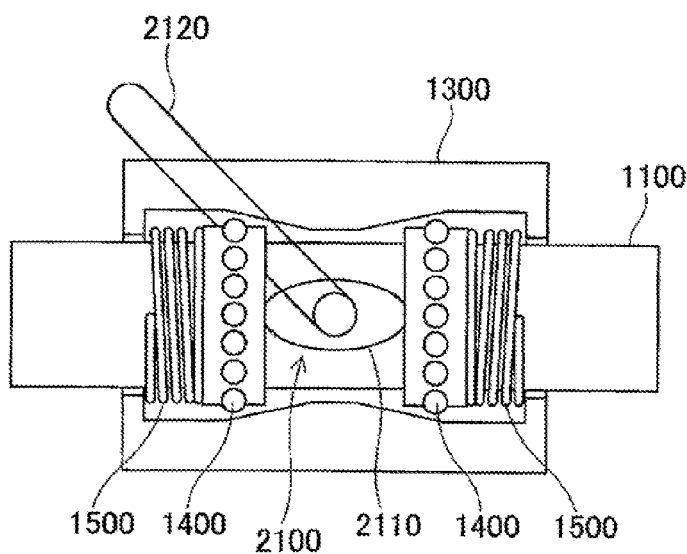

The schematic construction of a lever type release mechanism is shown in FIG. 2.

A stopper body 1300 has at least one pair of one-way stopper mechanisms 1700L, 1700R with the directions of wedge-like spaces 1200 becoming mutually opposite to each other with respect to a guide member 1100, so that the relative movement of the stopper body 1300 in the opposite directions of the reciprocating movement thereof with respect to the guide member 1100 is able to be restricted.

In particular, a tapered surface 1210 of each of the one-way stopper mechanisms 1700L, 1700R is arranged in an axially central portion (center) of a through hole 1310 in the stopper body 1300, wherein the wedge-like spaces 1200 are each constructed with a gap which becomes gradually smaller toward its center, so that rolling elements 1400 are arranged in directions to bite toward a central side from axially opposite end sides (opposite sides), and are pushed by rolling element pressing mechanisms 1500 in directions to bite into the wedge-like spaces 1200.

The lever type release mechanism 2100 is constructed such that it forces the rolling elements 1400 arranged in the wedge-like space 1200 of each of the one-way stopper mechanisms 1700L, 1700R to move in a direction in which the gap in the wedge-like space 1200 becomes larger, i.e., in a direction from the center toward the side, whereby the rolling elements 1400 are placed into an unclamped state with respect to the guide member 1100, thus making possible the relative movement of the stopper body 1300 in the axially opposite directions.

In the illustrated example, it is constructed such that an elliptical cam 2110 is driven to rotate by a lever 2120, so that the retainers 1600 for the rolling elements 1400 are caused to move in releasing directions due to a longer side cam surface of the elliptical cam 2110, or in directions to allow biting of the rolling elements due to a shorter side cam surface of the elliptical cam 2110.

Plate Type Release Mechanism

Figure 3A:
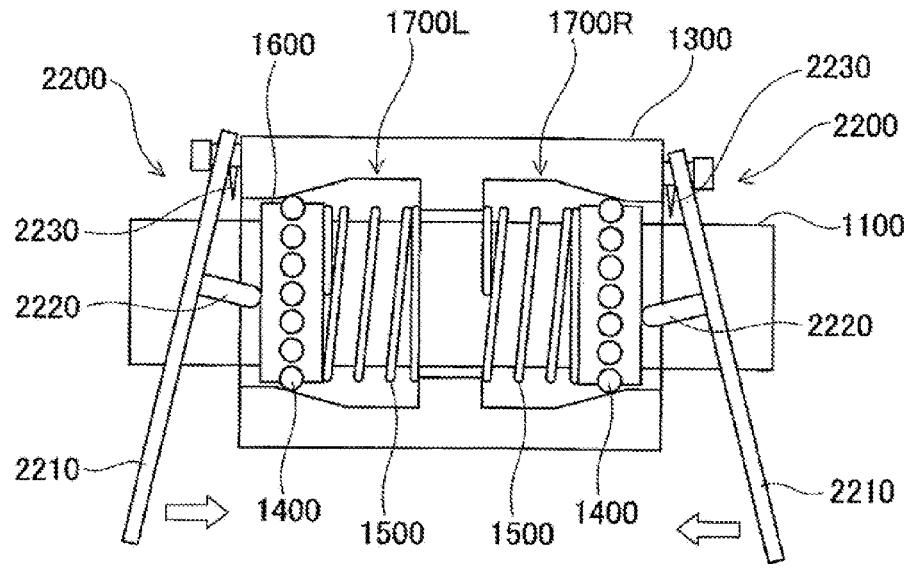
FIGS. 3A and 3B are views showing the schematic construction of a plate type release mechanism which is applied to the linear stopper of the present invention.
Figure 3B:
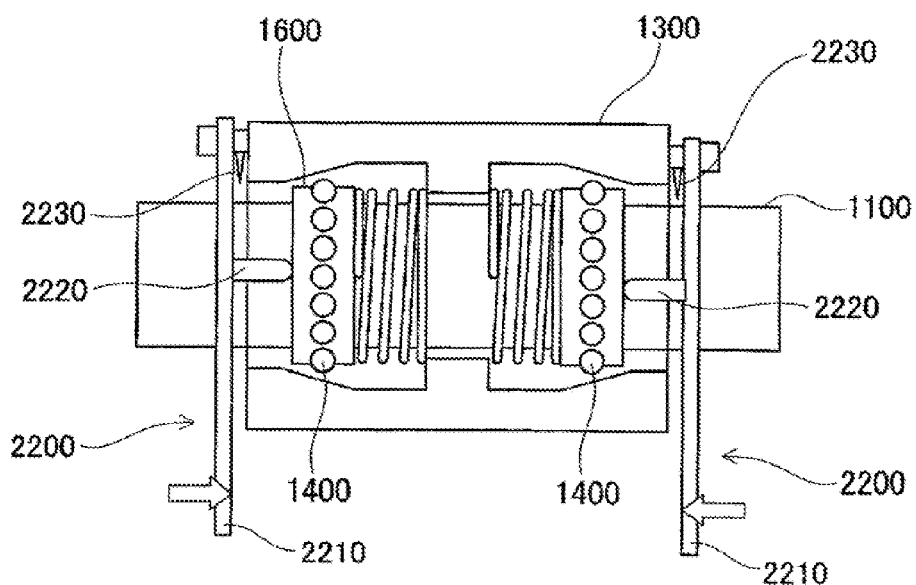
Figure 6A:
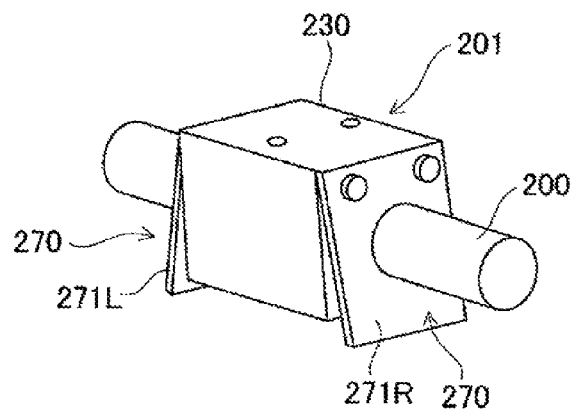
Figure 6B:
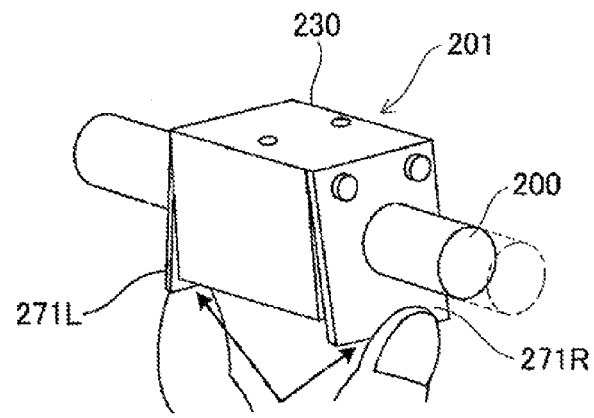
Figure 6C:
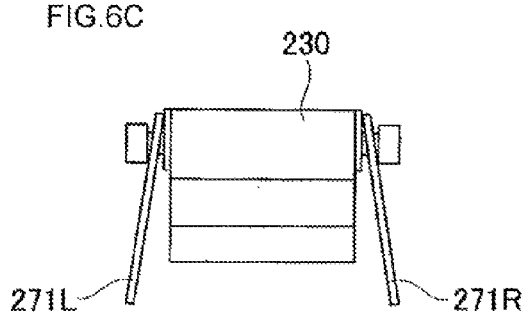
Figure 6D:
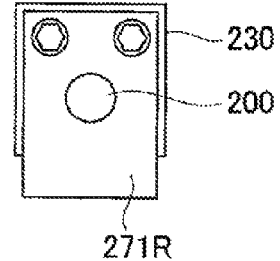

FIG. 3 shows the schematic construction of a plate type release mechanism 2200.

A stopper body 1300 has one-way stopper mechanisms 1700L, 1700R with the directions of wedge-like spaces 1200 becoming mutually opposite to each other with respect to a guide member 1100, so that the relative movement of the stopper body 1300 in the opposite directions of the reciprocating movement thereof with respect to the guide member 1100 is able to be restricted.

In this example, a tapered surface of each of the one-way stopper mechanisms 1700L is arranged in an axial end portion (side) of a through hole 1310 in the stopper body 1300, wherein the wedge-like spaces 1200 are each constructed with a gap becoming gradually smaller from its axially central portion (center) toward its opposite sides, so that the rolling elements 1400 are arranged in directions to bite toward the opposite sides from the center, and are pushed by rolling element pressing mechanisms 1500 in directions to bite into the wedge-like spaces 1200.

The release mechanism 2200 for the rolling elements 1400 is constructed such that it forces the rolling elements 1400 arranged in the wedge-like space 1200 of each of the one-way stopper mechanisms 1700L, 1700R to move in a direction in which the gap in the wedge-like space 1200 becomes larger, i.e., in a direction from the side toward the center, whereby the rolling elements 1400 are placed into an unclamped state with respect to the guide member 1100, thus making possible the relative movement of the stopper body 1300 in the axially opposite directions.

In the illustrated example, it is constructed such that plates 2210 arranged on axially opposite end faces (side faces) of the stopper body 1300 are driven to rotate in directions to move toward and away from the opposite end faces, respectively, so that each retainer 1600 is caused to move, by means of a protruded portion 2220 formed on each plate 2210, in a direction (i.e., toward the center side) to release the rolling elements 1400, thereby placing them in an unclamped state. Each plate 2210 has its one end supported in a freely rocking manner on an end face of the stopper body 1300, and its other end formed as a free end. In addition, when in a free state, each plate 2210 is held in an open state by means of a spring member 2230.

Each plate 2210 is formed in its middle portion with a protruded portion 2220 for pushing a retainer 1600, wherein the retainer 1600 is pushed in through the protruded portion 2220 against the pressing force of a rolling element pressing mechanism 1500, i.e., a spring force in the illustrated example, whereby the rolling elements 1400 bitten or engaged into a wedge-like space 1200 are forced to move, through the retainer 1600, in a direction in which a gap in the wedge-like space 1200 becomes larger (i.e., in a direction from the side toward the center).

By clipping and pushing in the plates 2210 at the opposite ends of the stopper body 1300, the one-way stop mechanisms 1700 L, 1700R at the opposite (left and right) sides can be released at once.

Ring Type Release Mechanism 2300

FIG. 4 shows the schematic construction of a linear stopper to which a ring type release mechanism 2300 is applied (for detailed construction, refer to FIGS. 12 through 15).

A stopper body 1300 has at least one pair of one-way stopper mechanisms 1700L, 1700R with the directions of wedge-like spaces 1200 becoming mutually opposite to each other with respect to a guide member 1100, so that the relative movement of the stopper body 1300 in the opposite directions of the reciprocating movement thereof with respect to the guide member 1100 is able to be restricted.

In particular, a tapered surface 1210 of each of the one-way stopper mechanisms 1700L, 1700R is arranged in an axially central portion (center) of a through hole 1310 in the stopper body 1300, wherein the wedge-like spaces 1200 are each constructed with a gap which becomes gradually smaller toward its center, so that rolling elements 1400 are arranged in directions to bite toward a central side from axially opposite end sides (opposite sides), and are pushed by rolling element pressing mechanisms 1500 in directions to bite into the wedge-like spaces 1200.

The ring type release mechanism 2300 is constructed such that it forces the rolling elements 1400 arranged in the wedge-like space 1200 of each of the one-way stopper mechanisms 1700L, 1700R to move in a direction in which the gap in the wedge-like space 1200 becomes larger, i.e., in a direction from the center toward the side, whereby the rolling elements 1400 are placed into an unclamped state with respect to the guide member 1100, thus making possible the relative movement of the stopper body 1300 in the axially opposite directions.

In the illustrated example, the ring type release mechanism 2300 is provided with: ring-shaped slide cams 2310 that are formed at opposed ends (center-side ends) of the pair of retainers 1600, respectively, and move in a hole axial direction together with rolling element cages, respectively; pins 2320 that are each inserted into between the opposed surfaces of the slide cams 2310 from the outside of the stopper body 1300 through a guide slit 1340 which is formed in the stopper body 1300 so as to extend in a circumferential direction thereof, so that slide pins 2320 are in sliding contact with the cam surfaces 2311 of the slide cams 2310; and an operation ring 2330 to which an outer end of each pin 2320 is fixedly secured, and which is fitted in a rotatable manner to an outer periphery of the stopper body 1300.

The cam surfaces 2311 of each slide cam 2310 are partially formed in three places in the circumferential direction, and the pins 2320 are also arranged in three places corresponding to these three cam surfaces 2311, and the pin guide slits 1340 are also formed in three places independently from one another.

The cam surfaces 2311 of the slide cams 2310, with which the pins 2320 are in sliding contact, are each formed of a slant or inclined surface which extends in the circumferential direction in an inclined manner at a predetermined lead angle. One circumferential end of each cam surface 2311 at its position closest to the center is at a clamp position, at which a corresponding pin 2320 is out of contact with the cam surface, and the rolling elements 1400 are in contact with the tapered surface 1210 of a corresponding wedge-like space 1200. From this clamp position, each cam surface 2311 extends in an inclined manner so as to cross the locus of the movement of a corresponding pin 2320, wherein by turning the pin 2320, it is made into contact with the cam surface 2311, so that the cam surface 2311 is pushed in an axial direction from the center to the side, whereby a corresponding retainer 1600 for the rolling elements 1400 is caused to move to the side through the slide cam 2310, thereby causing the rolling elements 1400 to separate from the tapered surface 1210 of a corresponding wedge-like space 1200.

The slide cams 2310 are allowed to move with respect to the stopper body 1300 in the hole axial direction, but are restricted against relative movement in the rotational direction.

Although in this example, the cam surfaces are formed at the retainer side, they may also instead be formed at the pin side.

Air Type Release Mechanism 2400

FIGS. 5A-5C show the schematic construction of a linear stopper to which an air type release mechanism 2400 is applied.

A stopper body 1300 has at least one pair of one-way stopper mechanisms 1700L, 1700R with the directions of wedge-like spaces 1200 becoming mutually opposite to each other with respect to a guide member 1100, so that the relative movement of the stopper body 1300 in the opposite directions of the reciprocating movement thereof with respect to the guide member 1100 is able to be restricted.

In particular, a tapered surface 1210 of each of the one-way stopper mechanisms 1700L, 1700R is arranged in an axially central portion (center) of a through hole 1310 in the stopper body 1300, wherein the wedge-like spaces 1200 are each constructed with a gap which becomes gradually smaller toward its center, so that rolling elements 1400 are arranged in directions to bite toward a central side from axially opposite end sides (opposite sides), and are pushed by rolling element pressing mechanisms 1500 in directions to bite into the wedge-like spaces 1200.

This air type release mechanism 2400 is constructed such that it forces the rolling elements 1400 arranged in the wedge-like space 1200 of each of the one-way stopper mechanisms 1700L, 1700R to move in a direction in which the gap in the wedge-like space 1200 becomes larger, i.e., in a direction from the center toward the side, whereby the rolling elements 1400 are placed into an unclamped state with respect to the guide member 1100, thus making possible the relative movement of the stopper body 1300 in the axially opposite directions.

In the illustrated example, an annular stepped portion 2410 provided with an air supply hole is formed in the center of the through hole 1310 in the stopper body 1300, and a hollow air expansion and contraction mechanism 2400, which can be expanded and contracted in a hole axial direction, is constructed between this annular stepped portion 2410 and a center-side end of a retainer 1600, wherein by means of this air expansion and retraction mechanism 2400, the rolling elements 1400 arranged in the wedge-like space 1200 of each of the one-way stopper mechanisms are forced to move in a direction in which the gap in the wedge-like space 1200 becomes larger, i.e., in a direction from the center toward the side, whereby the rolling elements 1400 are placed into an unclamped state with respect to the guide member, thus making possible the relative movement of the stopper body 1300 in the axially opposite directions.

The air expansion and contraction mechanism 2400 is, for example, of a sealed hollow annular structure, which has an inner peripheral wall and an outer peripheral wall formed of a bellows structure which can be expanded and contracted in the hole axial direction, with their tip ends being in abutment with an end of the retainer 1600 which holds the rolling elements. Then, by supplying air pressure to the interior of the air expansion and contraction mechanism 2400 from an air passage 2420 formed in the stopper body 1300, the air expansion and contraction mechanism 2400 is caused to expand, so that the retainer 1600 is pushed toward the side from the center, thereby moving the rolling elements 1400 away from the tapered surface 1210 of the wedge-like space 1200. Although in the illustration, the rolling elements 1400 are shown as apart from the guide member, this is a schematic view and in actuality, dimensions are such that the rolling elements 1400 are in contact with the guide member 1100.

Figure 7A:
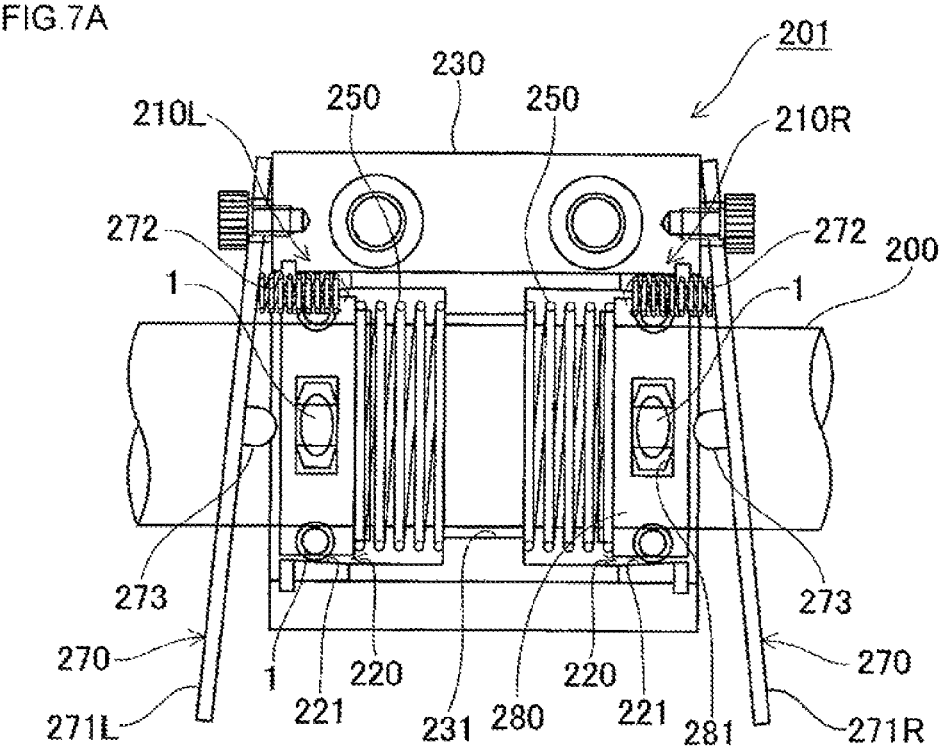
Figure 7B:
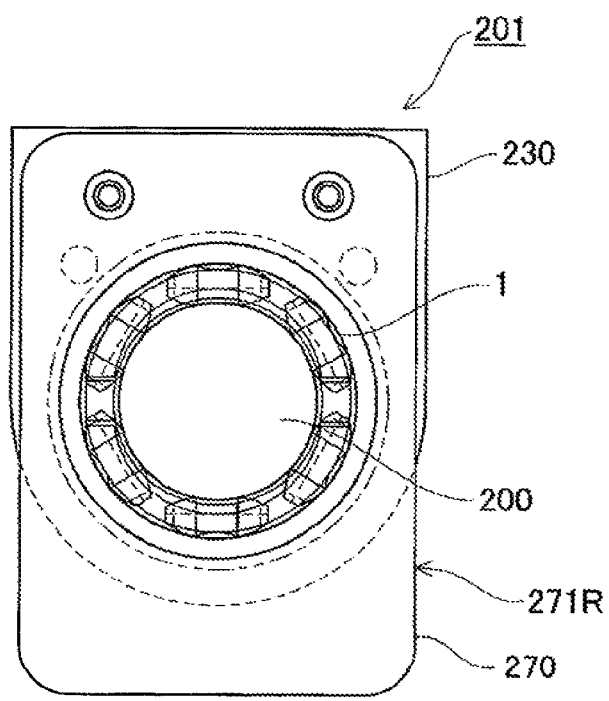

FIG. 6 and FIG. 7 show a linear stopper according to a first embodiment of the present invention.

Basically, this is an example in which the plate type release mechanism shown in FIG. 3 has been applied to the linear stopper.

First, a roller applied to this linear stopper will be described by the use of FIG. 8.

Figure 8A:
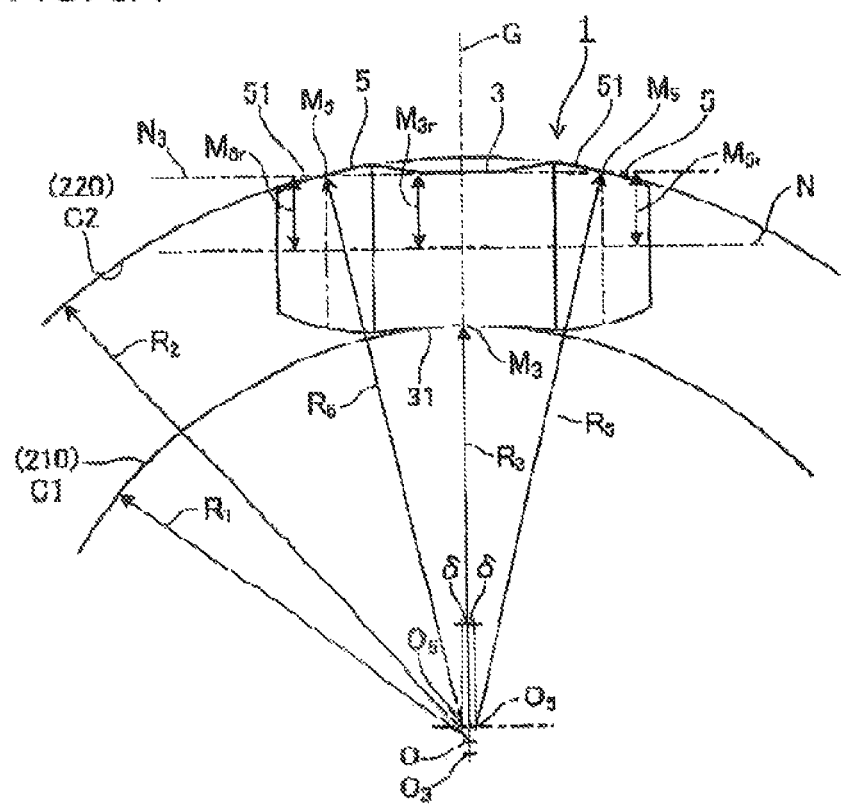
Figure 8B:
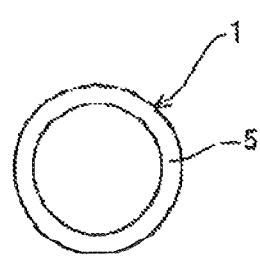

FIG. 8 shows the roller according to the embodiment of the present invention.

In this figure, reference numeral 1 denotes the roller as a whole, and this roller 1 is interposed between a guide surface C1 of a first guide member 210, which takes an arcuate convex shape, and a guide surface C2 of a second guide member 220, which takes an arcuate concave shape and is in opposition to the guide surface C1. The guide surface C1 of the first guide member 210 and the guide surface C2 of the second guide member 220 have the same center of curvature O, and are located on concentric circles.

The roller 1 is provided with a central concave surface portion 3 of which a cross sectional configuration cut by a surface passing through a roller central axis N is an arcuate concave shape, and which is in contact with the convex shaped guide surface C1 of the first guide member 210; and end convex surface portions 5, 5 which continue to the axially opposite sides of the central concave surface portion 3, and of which a cross sectional configuration cut by a surface passing through the roller central axis N is an arcuate convex shape, and which is in contact with the concave shaped guide surface C2 of the second guide member 220.

Assuming that an arcuate shape formed by cutting the central concave surface portion 3 with a plane passing through the roller central axis N is the central concave circular arc 31, a radius of curvature R3 of this central concave circular arc 31 is set to be slightly larger than a radius of curvature R1 of the convex shaped guide surface C1, and hence, a contact portion M3 of the central concave circular arc 31 in contact with the guide surface C1 geometrically becomes a point contact. In actuality, the contact portion has a certain width, and becomes a contact structure which has a pressure pattern with a geometric contact point as a peak of contact pressure. The magnitude of this radius of curvature R3 is slightly larger than the radius R1 of the guide surface C1, so as to provide such partial contact. When the magnitude of this radius of curvature R3 is set to be, for example, about 102% or thereabout of the radius R1 of the guide surface C1, a partial contact structure can be obtained. Of course, this is not limited to 102%.

On the other hand, assuming that circular arcs which are formed by cutting the opposite end convex surface portions 5, 5 with a plane passing through the roller central axis N are the opposite end convex circular arcs 51, 51, a radius of curvature R5 of each end concave circular arc 51 is slightly smaller than a radius of curvature R2 of the concave shaped guide surface C2, and hence, a contact portion M5 of each end concave circular arc 51 in contact with the guide surface C2 geometrically becomes a point contact. In actuality, the contact portion has a certain width, and becomes a contact structure which has a pressure pattern with a geometric contact point as a peak of contact pressure. The magnitude of this radius of curvature R5 is slightly smaller than the radius R2 of the guide surface C2, so as to provide such partial contact. The magnitude of this radius of curvature R5 is also set in a suitable manner according to the diameter of rollers, the magnitude of preload, etc., but when the magnitude of the radius of curvature R5 is set to be, for example, about 98% or thereabout of the radius R2 of the guide surface C2, a partial contact structure can be obtained. Of course, this is not limited to 98%.

In the present invention, a radius M3R of a contact portion M3 of the central concave surface portion 3 in contact with the guide surface C1 of the first guide member 210 from the roller central axis N, and a radius M5r of the opposite contact portions M5, M5 of the opposite end convex surface portions 5, 5 in contact with the guide surface C2 of the second guide member 220 from the roller central axis N are set to the same radius.

The contact portions M3, M5 are set as geometric contact points, respectively, and in the illustrated example, the contact portion M3 is located at the axial midpoint position of the central concave surface portion 3, and is a minimum diameter portion of the central concave surface portion 3. A radius center of curvature O3 becomes a position at a predetermined distance from the center of curvature O, as seen from the guide surface C1.

On the other hand, the contact portions M5, M5 of the opposite end convex surface portions 5, 5 are located on a line N3 which passes through the contact portion M3 of the central concave surface portion 3 and which is parallel to the roller central axis N, and the centers of curvature O5, O5 of the opposite end convex surface portions 5, 5 are located on normal lines which are orthogonal to tangent lines of the contact portions M5, respectively. These centers of curvature O5, O5 are deviated or shifted by a prescribed dimension δ with respect to an orthogonal line Q which passes through the center of curvature O of the guide surfaces C1, C2, and which is orthogonal to the roller central axis N, and are located at positions close to the center of curvature O, as seen from the guide surface C2.

Here, note that the lengths in the roller central axis direction of the right and left opposite end convex surface portions 5, 5 are set to the same length in this embodiment, but they may be different lengths in the right and left, respectively.

Next, reference will be made to a linear stopper using rollers as referred to above, with the use of FIG. 6 and FIG. 7.

That is, this linear stopper 201 is provided with a first stopper mechanism 210L and a second stopper mechanism 210R which are arranged in pair in the axial direction to form mutually oppositely directed one-way stopper mechanisms, and which can be mounted in a detachable manner on a linearly extending guide member 200 which serves to guide an object for free reciprocating movement.

In the illustrated example, the guide member 200 is a rod-shaped member of a circular cross section.

The first stopper mechanism 210R is of a construction including: a stopper body 230 that has a flat inclined surface 221 formed thereon, with a wedge-like space 220 being constructed between the inclined surface 221 and a surface of the guide member 200 with a gap decreasing gradually toward one side (right direction in the illustration) of the extending direction of the guide member 200; rollers 1 of the present invention that are arranged in the wedge-like space 220 so as to be rollable therein; and a pressing spring 250 acting as pressing means that presses the rollers 1 in a direction to bite into the wedge-like space 220, so that the rollers 1 are forced into pressure contact with the surface of the guide member 200 and the inclined surface 221 of the stopper body 230.

The stopper body 230 is composed of a cylindrical member of a quadrangular shape with a hole 231 of a circular cross section formed therein, and has the above-mentioned inclined surface formed on an inner surface thereof in opposition to one side surface of the guide member 200. The shape of the stopper body 230 is not limited to the quadrangular shape, but instead may also be a round shape or other shapes. In the illustrated example, the inclined surface 221 is a tapered shape which inclines in a conular shape corresponding to the guide member 200. The inclined surface 221 may be linear, or may be curved.

The rollers 1 are held by means of a retainer 280.

The retainer 280 is composed of a cylindrical member which has retaining holes 281 formed therein for holding or retaining the rollers 1.

On the other hand, the pressing spring 250 is a coil spring, which has one end engaged with a stepped portion of the stopper body 230 formed at a back or deep end thereof, and the other end engaged with an end of the retainer 280. The pressing spring 250 is not limited to the coil spring, but instead, other spring members such as a laminated spring, etc. can be used.

Thus, it is constructed such that the relative movement of the stopper body 230 with respect to the guide member 200 toward a side at which a gap of the wedge-like space 220 is large is restricted due to a biting action caused by the rolling contact of the rollers 1 in the wedge-like space 220, whereas the relative movement of the stopper body 230 with respect to the guide member 200 toward a side at which the gap of the wedge-like space 220 is small is allowed due to the sliding contact of the rollers 1 in the wedge-like space 220.

On the other hand, the second stopper mechanism 210L is of a construction in which a wedge-like space 220 is arranged in mutually opposite directions to that of the first stopper 20L with respect to the guide member 200, wherein it is constructed such that the relative movement of a stopper body 230 with respect to the guide member 200 toward a side at which a gap of the wedge-like space 220 is large is restricted due to a biting action caused by the rolling contact of rollers 1 in the wedge-like space 220, whereas the relative movement of the stopper body 230 with respect to the guide member 200 toward a side at which the gap of the wedge-like space 220 is small is allowed due to the sliding contact of the rollers 1 in the wedge-like space 220. According to such a construction, it is possible to restrict the relative movement of the stopper body 230 with respect to the guide member 200 to the opposite sides of the extending direction of the guide member 200. Because the basic construction of the second stopper mechanism 210L is the same as that of the first stopper mechanism 210R, the same symbols are attached to the same component parts, and the description thereof is omitted.

In this example, the wedge-like spaces 220 of the first stopper mechanism 210LR and the second stopper mechanism 210L are arranged in the central portion of the stopper body 230, so that their wide gap sides are in opposition to each other, whereas those sides of the wedge-like spaces 220 at which the gaps are wide are in mutually opposite directions, i.e., located at the central side of the stopper body 230.

In addition, in this embodiment, release mechanisms 270 acting as rolling element release means are provided which serve to force the rollers 1, 1 arranged in the wedge-like spaces 220, 220 of the first stopper mechanism 210R and the second stopper mechanism 210L to move in directions in which the gap in each wedge-like space 220 becomes larger, whereby the stopper body 230 is allowed to move relative to the guide member 200 toward a side at which the gaps in the wedge-like spaces 220, 220 are larger.

These release mechanisms 270 are constructed such that they are provided, on the axially opposite end surfaces of the stopper body 230, with a first pressing plate and a second pressing plate 271R, 271L for releasing the first stopper mechanism 210R and the second stopper mechanism 220L, respectively.

Referring to the first pressing plate 271R, an insertion hole through which the guide member 200 is inserted is formed through the first pressing plate 271R, and the first pressing plate 271R has one end supported by the stopper body 230 for free rocking motion, and the other end formed as a free end. In addition, when in a free state, the first pressing plate 271R is held in an open state by means of a spring member 272.

Then, a pressing head 273 for pushing the roller retainer of the first stopper mechanism 210R is formed on a middle portion of the first pressing plate 271R, wherein by pushing in the roller retainer 280 through the pressing head 273 against the spring force of the pressing spring 250, the individual rollers 1 arranged in the wedge-like space 220 of the first stopper mechanism 210R are forced to move through the roller retainer 280 in a direction in which the gap in the wedge-like space 220 becomes larger, so that they are caused to move with respect to the guide member 200 to a side in which the gap in the wedge-like space 220 is large.

Referring to the second pressing plate 271L, too, it is one and the same as the first pressing plate 271R, and an insertion hole through which the guide member 200 is inserted is formed through the second pressing plate 271L, and the second pressing plate 271L has one end supported by the stopper body 230 for free rocking motion, and the other end formed as a free end. In addition, when in a free state, the second pressing plate 271L is held in an open state by means of a spring member 272.

Then, a pressing head 273 for pushing the roller retainer 280 of the second stopper mechanism 210L is formed on a middle portion of the second pressing plate 271L, wherein by pushing in the roller retainer 280 through the pressing head 273 against the spring force of the pressing spring 250, the individual rollers 1 arranged in the wedge-like space 220 of the second stopper mechanism 210L are forced to move through the roller retainer 280 in a direction in which the gap in the wedge-like space 220 becomes larger.

The first and second pressing plates 271R, 271L are arranged at the axially opposite end sides of the stopper body 230, so that the first and second stopper mechanisms 210R, 220L can be released at once by pinching the first and second pressing plates 271R, 271L with a hand or fingers and pushing them in.

With the linear stopper 201 of the above-mentioned construction, in a state where it is removed from the guide member 200, the roller retainers 280 are engaged with the stepped portions of the stopper body 230, respectively, so that the rollers 1 are supported by the stopper body 230 through the roller retainers 280.

Then, in a state where the first and second pressing plates 271R, 271L are pushed in, the inner periphery of the stopper body 230 is caused to move from one end of the guide member 200 up to an appropriate position of the guide member 200. The roller retainers 280 of the first stopper mechanism 210R and the second stopper mechanism 210L are moved in directions to mutually approach by means of the pressing heads 273, with the first and second pressing plates 271R, 271L being pushed in, so the individual rollers 1 of the first and second stopper mechanisms 210R, 210L slide on the surface of the guide member 200, and move to their predetermined positions, without biting into the wedge-like spaces 220, 220.

When the hand or fingers are removed from the first and second pressing members 271R, 271L, the individual roller retainers 280, 280 are urged in directions to bite into the wedge-like spaces 220, 220 by means of the individual pressing springs 250, 250 of the first and second stopper mechanisms 210L, 210R, respectively, so that the rollers 1, 1 are pushed against the side surface of the guide member 200 and the inclined surfaces 221, 221 in the wedge-like spaces 220, 220, respectively.

In this state, even if the stopper body 230 is to be moved with respect to the guide member 200 to either side of the extending direction of the guide member 200, the rollers 1 in either of the first and second stopper mechanisms 210L, 210R will bite into any of the wedge-like spaces 220 due to rolling contact therebetween, and the relative movement of the stopper body 230 will be restricted.

In addition, contact pressure is increased due to the biting action of these rollers 1, 1, and hence, even if the contact surfaces between the rollers and the guide member 200 and between the rollers and the stopper body 230 are circular, the sliding of the rollers in the circumferential direction is restricted by the friction of contact, thus making it possible to restrict the rotation of the rollers.

Then, in cases where the guide member 200 is caused to move again, by pushing in the first and second pressing plates 271R, 271L of the release mechanisms 270, the biting of the rollers into the wedge-like spaces 220 is released, thus making it possible for the rollers to move freely in either direction. Releasing of the rollers is easy because of biting of the rollers 1.

In addition, the wedge-like spaces of the first stopper mechanism 210R and the second stopper mechanism 210L are arranged in such a manner that their wide gap sides are in opposition to each other in the central portion of the stopper body 230, but on the contrary, they may also instead be arranged in such a manner that those sides of the wedge-like spaces at which the gaps are narrow are in mutual opposition to each other in the central portion of the stopper body 230. In that case, though not illustrated in particular, it may be a mechanism in which the retainers 280 can be pulled by pushing in the first and second pressing plates 271R, 271L, or other release mechanisms may be constructed.

Moreover, although in the above-mentioned embodiment, it is constructed such that movements of the guide member 200 to the opposite sides of the extending direction thereof are restricted, the construction may also be such that only the movement of the guide member 200 to one side of the extending direction is restricted by means of only a one-way stop mechanism at one side.

Figure 9A:
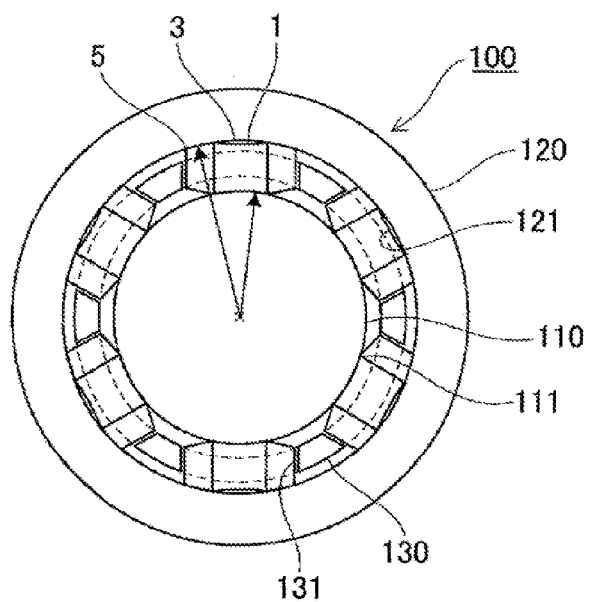
Figure 9B:
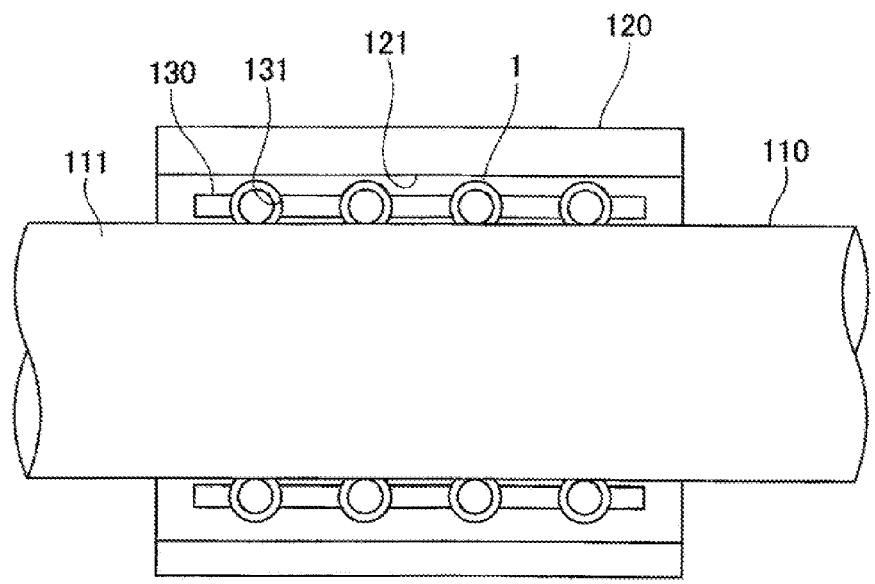
Figure 10A:
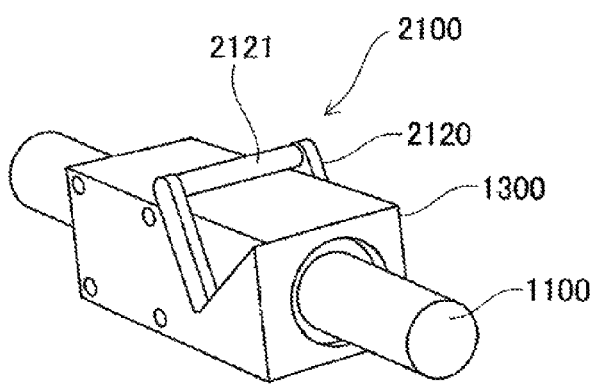
Figure 10B:
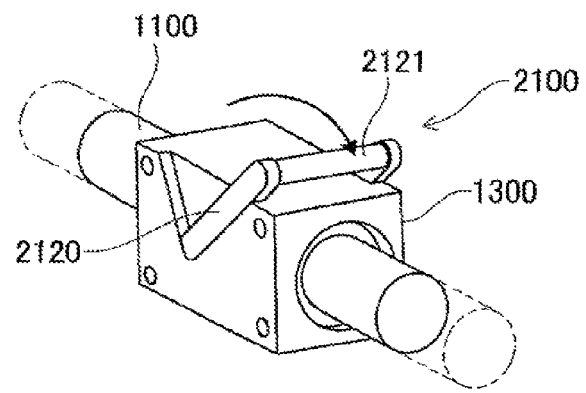
Figure 10C:
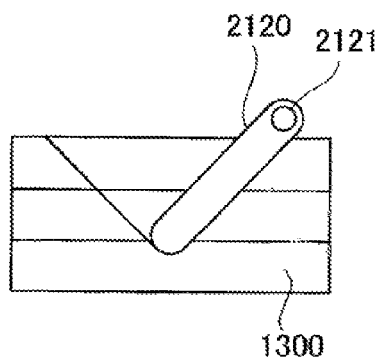
Figure 10D:
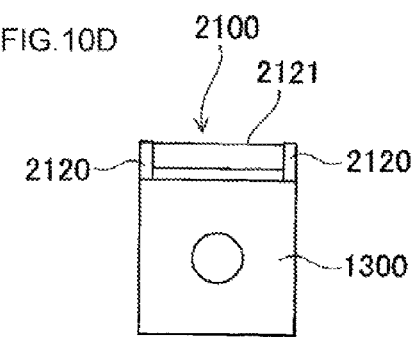
Figure 11A:
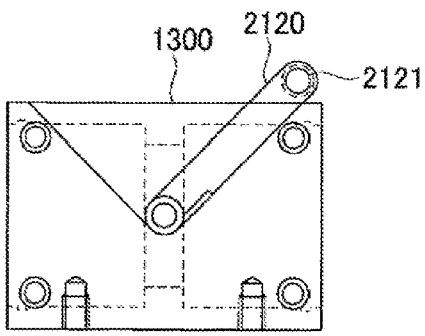
Figure 11B:
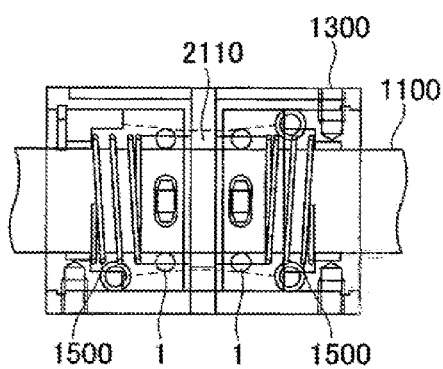
Figure 11C:
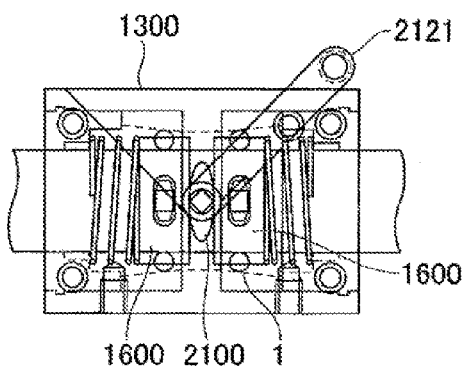
Figure 11D:
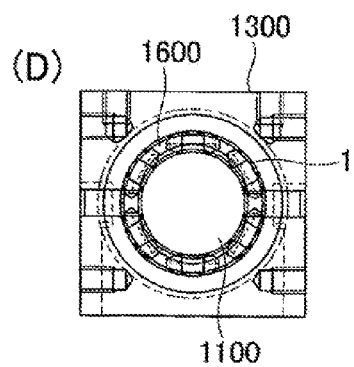
Figure 11E:
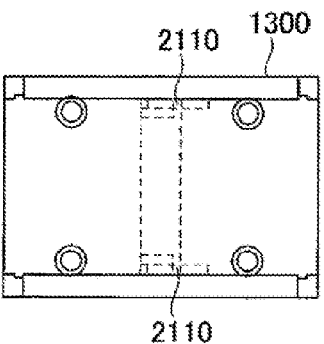
Figure 12A:
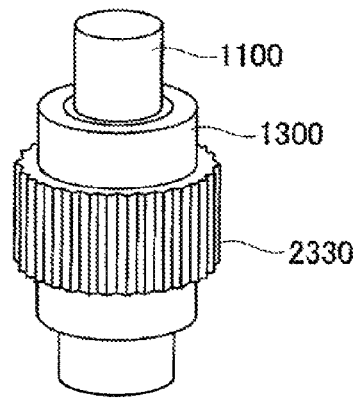
Figure 12B:
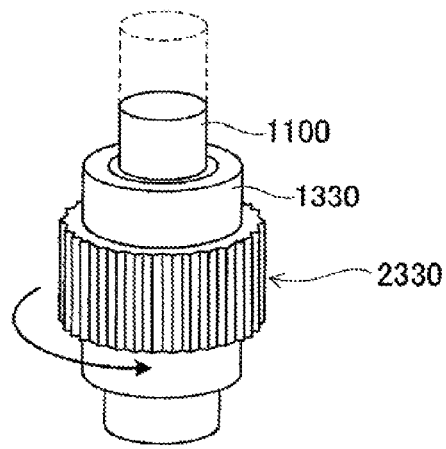
Figure 12C:
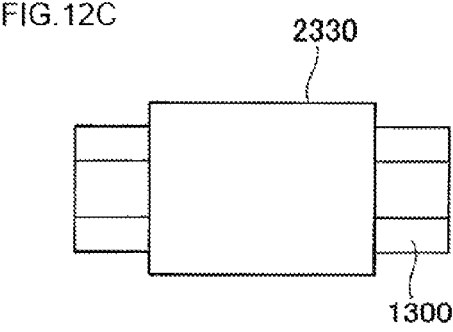
Figure 12D:
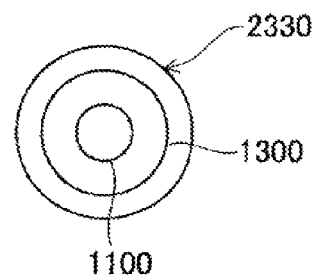
Figure 13B:
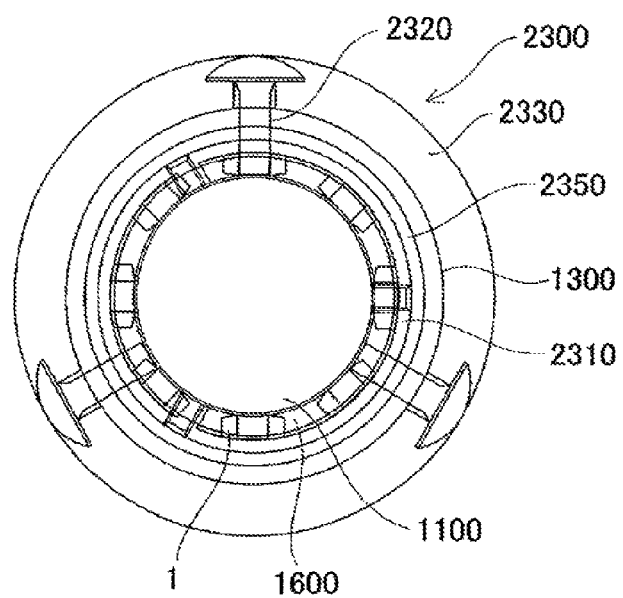
Figure 13A:
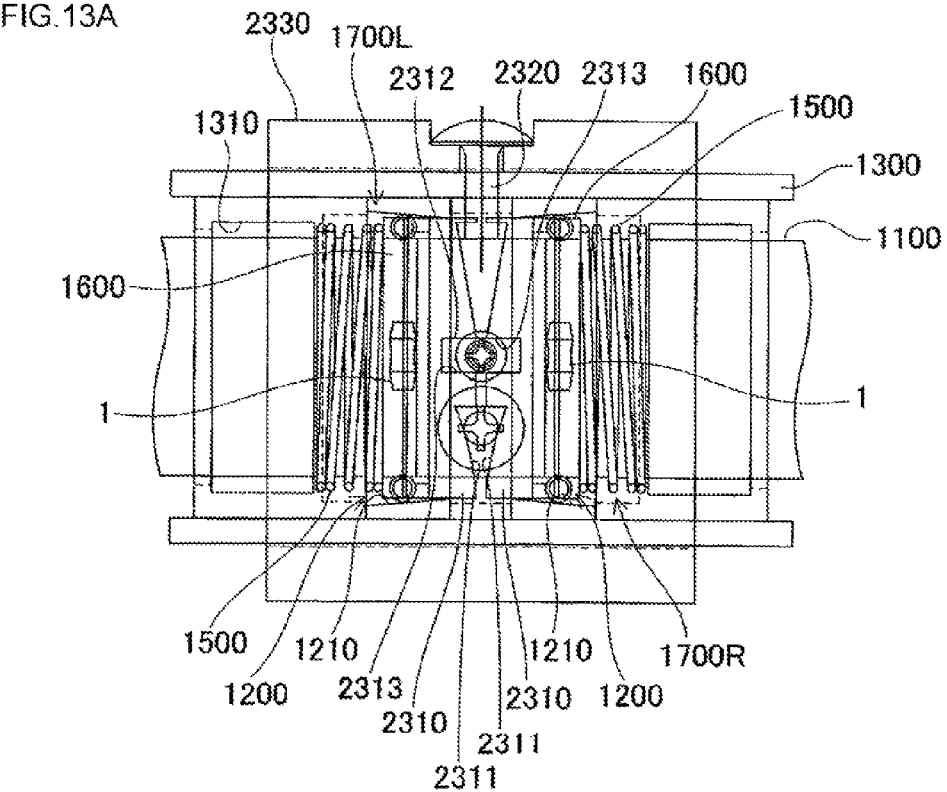
Figure 14:
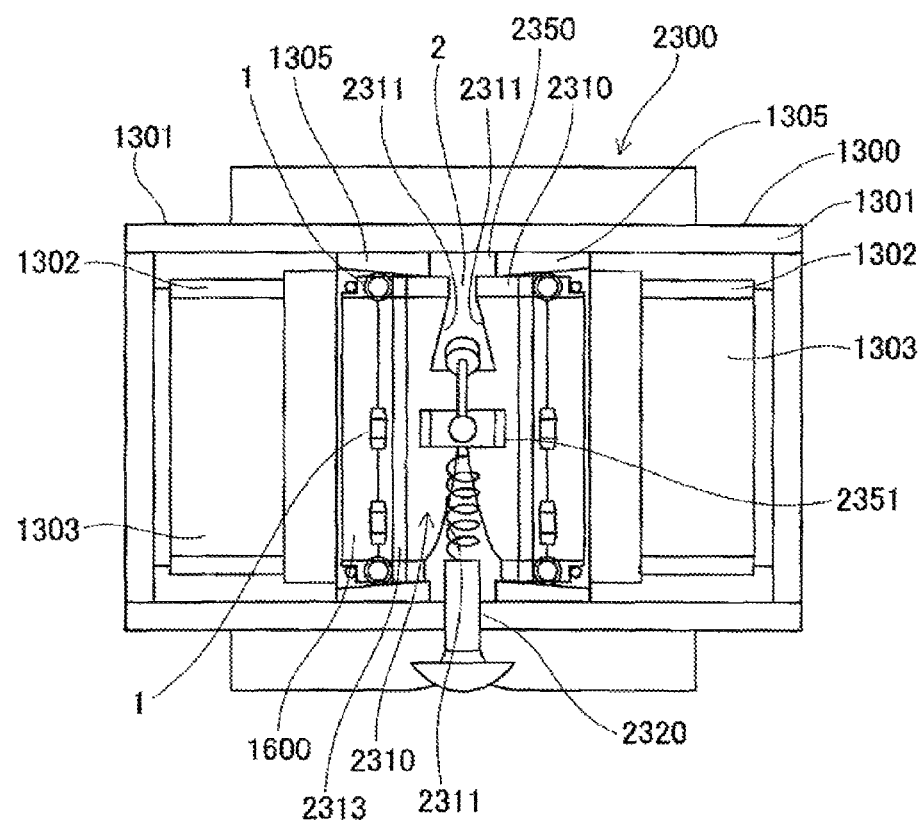
FIG. 14 is a view similar to FIG. 13A, but with the exclusion of a guide member.

FIG. 9 shows an example of a roller guide device using the above-mentioned rollers 1.

As a conventional roller guide device using rollers, there has been known one as described in Japanese patent application laid-open No. S62-227532, for example. That is, the rollers acting as rolling elements are interposed between a guide shaft in the form of a round shaft and a bush, which is fitted over the guide shaft so as to be guided in a linear manner along the guide shaft.

For the rollers used for this roller guide device, there have been used rollers of a special shape, each of which is provided with a central concave surface portion which is in contact with an outer peripheral surface of the shaft, and end convex surface portions which extend toward opposite end sides in the roller axial direction of this central concave surface portion, and are in line contact with an inner peripheral surface of the bush.

Although this roller provides a rolling guide mechanism of high rigidity, the roller of this special shape has a peripheral speed difference between the central concave surface portion and the end convex surface portions, so there has been a problem that differential sliding or slipping occurs between the rolling contact surface of the central concave surface portion and the rolling contact surfaces of the end convex surface portions, thus giving rise to early wear due to the sliding.

The rollers of the present invention serve to eliminate the differential sliding or slipping between the central concave surface portion and the end convex surface portions.

The roller guide device 100 of the present invention is constructed to include a circular guide shaft 110 of a limited slide type as a first guide member that is provided with an arcuate guide surface, a cylindrical body 120 as a second guide member that is provided with an arcuate guide surface 121 which is in opposition to the guide surface 111 of this guide shaft 110 and which has a radius of curvature larger than that of the guide surface 111 of the guide shaft 110, and rollers 1 of the present invention that are interposed in a freely rollable manner between the guide surface 111 of the guide shaft 110, and the guide surface 121 of the cylindrical body 120.

These rollers 1 are held by a roller retainer 130, and the cylindrical body 120 is freely movable relative to the guide shaft 110 through the rollers 1. The diameter of each roller 1 is made larger than the distance or interval between the guide surfaces 111, 121, so that a preload is given to the rollers.

The rollers 1 are arranged in plurality in the axial direction and in the circumferential direction. The arrangement of rollers in the circumferential direction may be arranged in a plurality of rows at the same phase or at mutually different phases in the axial direction. In addition, as for the arrangement of the rollers in the axial direction, too, the rollers may be arranged at the same phase in the circumferential direction axial, but can be arranged at different phases in the circumferential direction.

The roller retainer 130 is a cylindrical member, and is inserted in an annular space between the outer periphery of the guide shaft 110, and the inner periphery of the cylindrical body 120, so that the rollers 1 are held in a freely rotatable manner in retaining holes 131, respectively, formed in the roller retainer 130. The holding of the rollers in these retaining holes 131 is to prevent the rollers 1 from falling off at the time when the roller retainer 130 is pulled out, and it is constructed such that the holding is carried out in such a manner as to hold the circumferential surfaces of the individual rollers 1.

The range of movement of the cylindrical body 120 is a range in which the cylindrical body 120 is held by the roller retainer 130. However, if a recirculation passage(s) for the rollers is formed in the cylindrical body 120, it will be possible to achieve an endless sliding type roller guide.

The guide surface 111 of the guide shaft 110 is a cylindrical outer peripheral surface of the cylindrical guide shaft 110, and the guide surface 121 of the cylindrical body 120 is a cylindrical inner peripheral surface of the cylindrical body 120.

It is constructed such that a circle which forms the cylinder of the guide surface 111 of this guide shaft 110 corresponds to a first reference circle C1 of the rollers 1 which is shown in FIG. 1, and that a circle which forms the cylinder of the guide surface 121 of the cylindrical body 120 corresponds to a second reference circle C2 of the rollers 1.

Accordingly, a prescribed amount of width around the contact portion M3 of the central concave surface portion 3 of each roller 1 is in contact with the guide surface 111 of the guide shaft 110, and a prescribed width around each of the contact portions M5 of the opposite end convex surface portions 5 is in contact with the guide surface 121 of the inner peripheral surface of the cylindrical body 120.

Because the radii of both the contact portions M3, M5 of the central concave surface portion 3 and the opposite end convex surface portions 5 from the roller central axis N are the same radius, the peripheral speeds of these contact portions at the time of rolling of each roller become the same, and a differential slide or slip therebetween is made small, so that the sliding wear of the guide surfaces 111, 121 of the central concave surface portion 3 and the opposite end convex surface portions 5 can be maintained to a minimum, thus making it possible to attain the extension of life span.

Here, note that the roller guide device is not limited to a cylindrical shape, but may be not only such a roller bush which is provided with a cylindrical body and a guide shaft, but also such a structure in which the rollers of the present invention are interposed in a freely rollable manner between a convex arcuate guide surface and a concave arcuate guide surface, of which the centers of curvature are the same.

Moreover, the rollers of the present invention are not limited to application to guide devices, but can be applied to various kinds of devices.

FIG. 10 and FIG. 11 show an example using the lever type release mechanism illustrated in FIG. 2.

Lever Type Construction

A stopper body 1300 has at least one pair of one-way stopper mechanisms 1700L, 1700R with the directions of wedge-like spaces 1200 becoming mutually opposite to each other with respect to a guide member 1100, so that the relative movement of the stopper body 1300 in the opposite directions of the reciprocating movement thereof with respect to the guide member 1100 is able to be restricted.

In particular, a tapered surface 1210 of each of the one-way stopper mechanisms 1700L, 1700R is arranged in an axially central portion (center) of a through hole 1310 in the stopper body 1300, wherein the wedge-like spaces 1200 are each constructed with a gap which becomes gradually smaller toward its center, so that rolling elements 1400 are arranged in directions to bite toward a central side from axially opposite end sides (opposite sides), and are pushed by rolling element pressing mechanisms 1500 in directions to bite into the wedge-like spaces 1200.

The lever type release mechanism 2100 is constructed such that it forces the rolling elements 1400 arranged in the wedge-like space 1200 of each of the one-way stopper mechanisms 1700L, 1700R to move in a direction in which the gap in the wedge-like space 1200 becomes larger, i.e., in a direction from the center toward the side, whereby the rolling elements 1400 are placed into an unclamped state with respect to the guide member 1100, thus making possible the relative movement of the stopper body 1300 in the axially opposite directions.

In the illustrated example, it is constructed such that an elliptical cam 2110 is driven to rotate by a lever 2120, so that the retainers 1600 for the rolling elements 1400 are caused to move in releasing directions due to a longer side cam surface of the elliptical cam 2110, or in directions to allow biting of the rolling elements due to a shorter side cam surface of the elliptical cam 2110.

The cam 2110 is arranged in pair on an axial line, which is orthogonal to the central axis of the guide member 1100, in a gap between the outer periphery of the guide member 1100 and the inner periphery of the through hole in the stopper body, so as to be in opposition to each other with respect to the central axis. Each cam is fixedly secured to an inner end of a rotation shaft supported for free rotation in a bearing hole formed in a lever main body, and one end of the lever for rotating the rotation shaft is fixedly secured to an outer end of the rotation shaft.

Each cam is rotatable between two positions, i.e., an unclamp position in which a major or longer axis of the cam becomes parallel to the central axis of the guide member, and a clamp position in which the longer axis becomes orthogonal to the central axis of the guide member, in an angular range of approximately 90 degrees. Each lever is urged, in a free state thereof, by means of a return spring so that it is located in the clamp position. In this clamp position, each cam is not in contact with the rolling element cages, and is in a position in which it can not prevent biting of the rolling elements.

The levers extend in a direction orthogonal to the rotation shaft of the cams, and the levers on the opposite sides have their tip ends connected with each other by a connection bar, thus forming an inverted U shape as a whole.

In addition, the levers are held in the clamp positions by means of a pair of torsion coil springs on opposite sides, which serve to always urge the longer side cam surfaces in directions toward the clamp positions.

The stopper body is formed on its side surfaces with concave portions each in the shape of a sector over the rotation range of the levers, wherein the levers rotate along the concave portions, respectively, and in the clamp positions, the levers are brought into abutment with the ends of the concave portions by the urging forces of the return springs, respectively.

FIG. 12 through FIG. 15 show a linear stopper using the ring type release mechanism illustrated in FIG. 4.

A stopper body 1300 has at least one pair of one-way stopper mechanisms 1700L, 1700R with the directions of wedge-like spaces 1200 becoming mutually opposite to each other with respect to a guide member 1100, so that the relative movement of the stopper body 1300 in the opposite directions of the reciprocating movement thereof with respect to the guide member 1100 is able to be restricted.

In particular, a tapered surface 1210 of each of the one-way stopper mechanisms 1700L, 1700R is arranged in an axially central portion (center) of a through hole 1310 in the stopper body 1300, wherein the wedge-like spaces 1200 are each constructed with a gap which becomes gradually smaller toward its center, so that rolling elements 1400 are arranged in directions to bite toward a central side from axially opposite end sides (opposite sides), and are pushed by rolling element pressing mechanisms 1500 in directions to bite into the wedge-like spaces 1200.

The ring type release mechanism 2300 is constructed such that it forces the rolling elements 1400 arranged in the wedge-like space 1200 of each of the one-way stopper mechanisms 1700L, 1700R to move in a direction in which the gap in the wedge-like space 1200 becomes larger, i.e., in a direction from the center toward the side, whereby the rolling elements 1400 are placed into an unclamped state with respect to the guide member 1100, thus making possible the relative movement of the stopper body 1300 in the axially opposite directions.

In the illustrated example, the ring type release mechanism 2300 is provided with: ring-shaped slide cams 2310 that are formed at opposed ends (center-side ends) of the pair of retainers 1600, respectively, and move in a hole axial direction together with rolling element cages, respectively; pins 2320 that are each inserted into between the opposed surfaces of the slide cams 2310 from the outside of the stopper body 1300 through a guide slit 1340 which is formed in the stopper body 1300 so as to extend in a circumferential direction thereof, so that slide pins 2320 are in sliding contact with the cam surfaces 2311 of the slide cams 2310; and an operation ring 2330 to which an outer end of each pin 2320 is fixedly secured, and which is fitted in a rotatable manner to an outer periphery of the stopper body 1300.

In the illustrated example, the cam surfaces 2311 of each slide cam 2310 are partially formed in three places in the circumferential direction, and the pins 2320 are also arranged in three places corresponding to these three cam surfaces 2311, and the pin guide slits 1340 are also formed in three places independently from one another.

The cam surfaces 2311 of the slide cams 2310, with which the pins 2320 are in sliding contact, are each formed of a slant or inclined surface which extends in the circumferential direction in an inclined manner at a predetermined lead angle. One circumferential end of each cam surface 2311 at its position closest to the center is at a clamp position, at which a corresponding pin 2320 is out of contact with the cam surface, and the rolling elements 1400 are in contact with the tapered surface 1210 of a corresponding wedge-like space 1200. From this clamp position, each cam surface 2311 extends in an inclined manner so as to cross the locus of the movement of a corresponding pin 2320, wherein by turning the pin 2320, it is made into contact with the cam surface 2311, so that the cam surface 2311 is pushed in an axial direction from the center to the side, whereby a corresponding retainer 1600 for the rolling elements 1400 is caused to move to the side through the slide cam 2310, thereby causing the rolling elements 1400 to separate from the tapered surface 1210 of a corresponding wedge-like space.

The slide cams 2310 are allowed to move with respect to the stopper body 1300 in the hole axial direction, but are restricted against relative movement in the rotational direction.

The stopper body 1300 is provided with a cylindrical body portion 1301, taper rings 1305 that form the tapered surfaces 1210, respectively, collars 1302 for fixing the taper rings 1305 with respect to the axial direction, respectively, and guide bushes 1303 that are in sliding contact with the guide member 1100. In addition, in the illustrated example, a restriction ring 2350 is provided which serves to allow the relative movement of the slide cams in the hole axial direction but to restrict the relative movement of the slide cams in the rotational direction, with respect to the stopper body. This restriction ring 350 is interposed between the outer peripheries of the slide cams 2310 and the inner peripheral surface of the stopper body 1300, and is fixedly secured to the stopper body 1300. It is constructed such that the restriction ring 2350 is formed with convex portions 2351 which are in engagement with restriction grooves 2313 formed in the slide cams 2310 to extend in the hole axial direction, whereby the movements of the slide cams 2310 in the hole axial direction are allowed, but the relative movements thereof in the rotational direction are restricted. The restriction grooves 2313 are formed in three places in the circumferential direction by making use of between the adjacent cam surfaces 2311, and the convex portions 2351 of the restriction ring 2350 are also formed in three places in the circumferential direction.

Figure 16A:
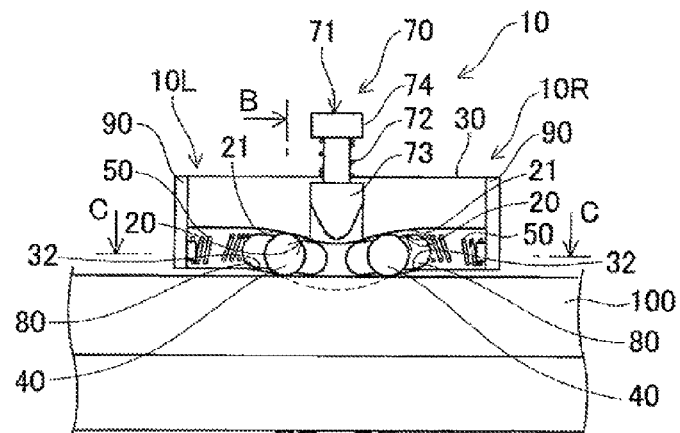
Figure 16B:
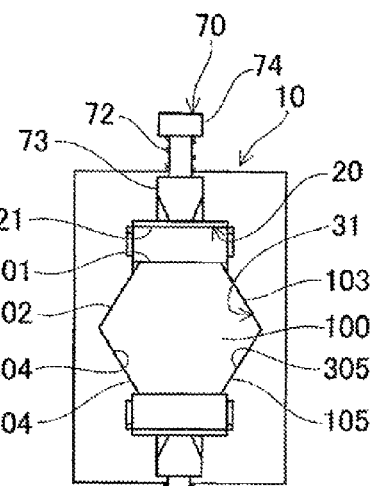
Figure 16C:
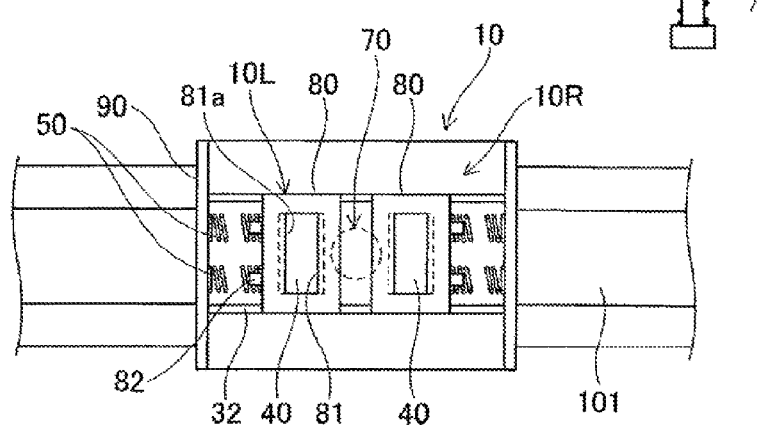
Figure 17:
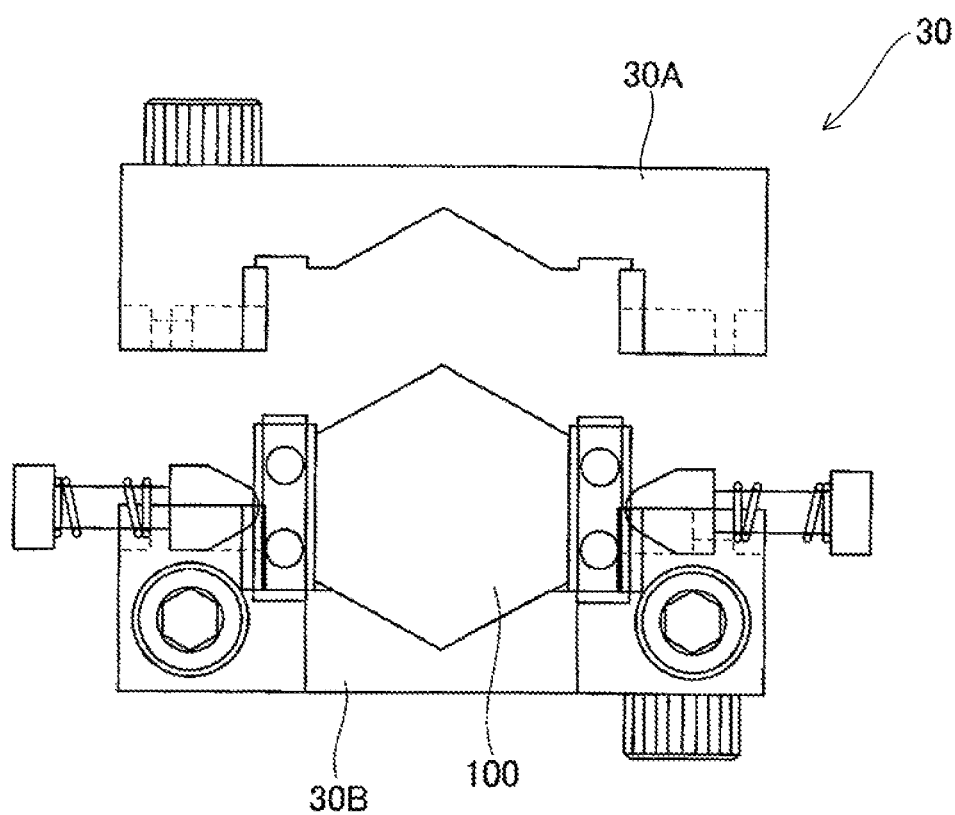
FIG. 17 is a view showing an exploded construction example of the linear stopper of FIG. 16.

FIG. 16 shows a schematic cross sectional view of a linear stopper according to another embodiment of the present invention.

That is, this linear stopper 1 is constructed such that a pair of bidirectional stopper mechanisms are arranged with a guide member 100 sandwiched therebetween, wherein each bidirectional stopper mechanism is provided with a first stopper mechanism 10L and a second stopper mechanism 10R which are arranged in pair in the axial direction to form mutually oppositely directed one-way stopper mechanisms, and which can be mounted in a detachable manner on a linearly extending guide member 100 which serves to guide an object for free reciprocating movement. Because the individual bidirectional stopper mechanisms 10 are of the same construction, one of the bidirectional stopper mechanisms 10 will be described below.

In the illustrated example, the guide member 100 is a rod-shaped member of a hexagonal cross section, and the first stopper mechanism 10L and the second stopper mechanism 10R are mounted on two mutually opposite side surfaces of the hexagonal guide member 100 in opposition to each other. Although in this example, the guide member 100 has a hexagonal shape in cross section, it is not limited to the hexagonal shape, but may instead be a triangle, a rectangle, pentagon, or a heptagonal or other polygonal shape. Also, it is not limited to polygonal shapes, but may of course be a circular shape in cross section. In addition, the guide member 100 may not be a floated rail, but may instead be of a laid down guide structure in which one side of a guide member is laid down.

The first stopper mechanism 10L, which is a one-way stop mechanism constituting the bidirectional stopper mechanism 10, is of a structure including: a stopper body 30 that has a flat inclined surface 21 formed thereon, with a wedge-like space 20 being constructed between the inclined surface 21 and a surface of the guide member 100 with a gap decreasing gradually toward one side (right direction in the illustration) of the extending direction of the guide member 100; rollers 40 acting as rolling elements that are arranged in the wedge-like space 20 so as to be rollable therein; and pressing springs 50 acting as rolling element pressing means that press the rollers 40 in a direction to bite into the wedge-like space 20, so that the rollers 40 are forced into pressure contact with the surface of the guide member 100 and the inclined surface 21 of the stopper body 30.

The stopper body 30 is composed of a hollow cylindrical member of a quadrangular shape through which a hole 31 of a hexagonal shape in cross-section is formed, and which has the above-mentioned inclined surface formed on an inner surface in opposition to one side surface of the guide member 100. In the illustrated example, the inclined surface 21 takes a shape curved in a concave shape with respect to the guide member 100. However, the inclined surface 21 may be linear, or in some cases, may be curved in a convex shape.

This stopper body 30 may have a two-piece construction formed of a first half body 30A and a second half body 30B, which are fixedly fastened to each other by means of bolts, as shown in FIG. 2.

On the other hand, the rollers 40 are held by means of a retainer 80. The retainer 80 is composed of a plate-like member of a quadrangular shape which has retaining holes 81 formed therein for holding or retaining the rollers 40. The retaining holes 81 each have front and rear end edges 81a formed into an arcuate shape conforming to the curvature of each roller 40, so that the rollers 40 are held in the retaining holes 81 by the front and rear end edges 81a thereof.

On the other hand, the retainer 80 has its right and left side ends engaged with guide grooves 32, respectively, formed in an inner surface of the inner periphery of the stopper body 30, wherein when the stopper body 30 is pulled out from the guide member 100, the retainer 80 is held in the guide grooves 32, and the rollers 40 are supported by the stopper body 30 through the retainer 80. The width of each guide groove 32 is larger than the thickness of the retainer 80, and when the retainer 80 is assembled or engaged into the guide grooves 32, the ends of the retainer 80 come into contact with the side surfaces of the guide member 100.

In addition, the pressing springs 50 are coil springs, each of which has one end engaged with a spring retaining plate 90 fixedly attached to one end face of the stopper body 30, and the other end engaged with a convex portion 32 formed on one end of the retainer 80, which becomes a spring seat.

Thus, it is constructed such that the relative movement of the stopper body 30 with respect to the guide member 100 toward a side (L) at which a gap of the wedge-like space 20 is large is restricted due to a biting action caused by the rolling contact of the rollers 40 in the wedge-like space 20, whereas the relative movement of the stopper body 30 with respect to the guide member 100 toward a side (R) at which the gap of the wedge-like space 20 is small is allowed due to the sliding contact of the rollers 40 in the wedge-like space 20.

Figure 1B:
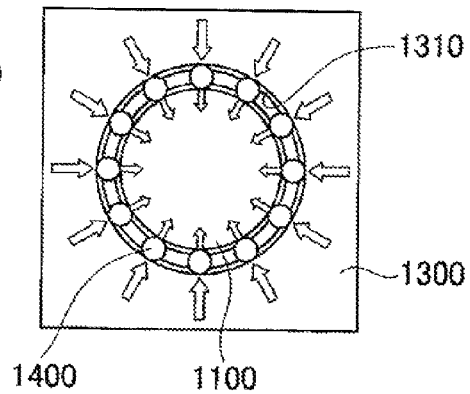
Figure 1C:
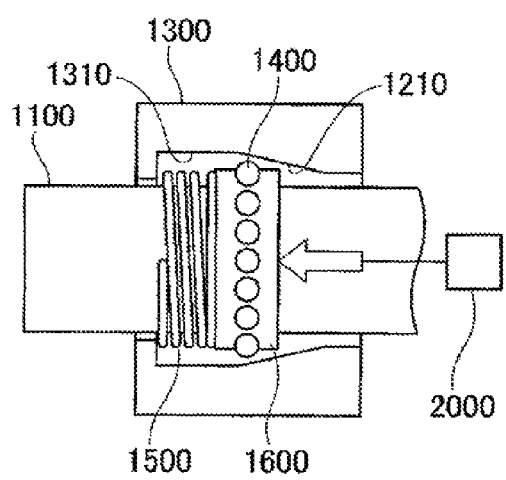
Figure 1D:
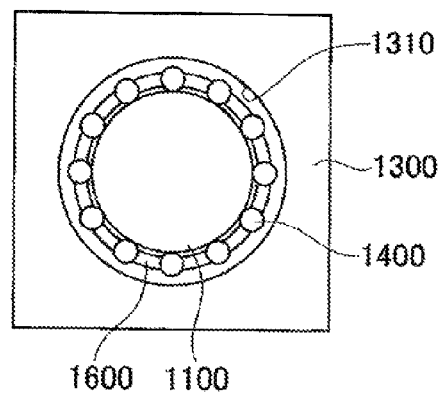

Moreover, the stopper body 30 is provided with a reaction force support part which is in engagement with the guide member 100 to support a reaction force acting on the inclined surface 21 from the rollers 40 upon biting thereof into the wedge-like space 20 at the time of restriction of the relative movement of the stopper body 30. In this example, as shown in FIG. 1(B), the guide member 100 has a hexagonal shape in cross section, and inner surfaces 304, 305 of the hole 31, which are in engagement with side surfaces 104, 105 apart through adjoining side surfaces 102, 103 from a side surface 101 which forms the wedge-like space, become a pressure support part.

On the other hand, the second stopper mechanism 10R, which constitutes the bidirectional stopper mechanism 10, is of a construction in which a wedge-like space 20 is arranged in mutually opposite directions to that of the first stopper 10L with respect to of the guide member 100, wherein it is constructed such that the relative movement of a stopper body 30 with respect to the guide member 100 toward a side (R) at which a gap of the wedge-like space 20 is large is restricted due to a biting action caused by the rolling contact of rollers 40 in the wedge-like space 20, whereas the relative movement of the stopper body 30 with respect to the guide member 100 toward a side (L) at which the gap of the wedge-like space 20 is small is allowed due to the sliding contact of the rollers 40 in the wedge-like space 20. According to such a construction, it is possible to restrict the relative movement of the stopper body 30 with respect to the guide member 100 to the opposite sides of the extending direction of the guide member 100. Because the basic construction of the second stopper mechanism 10R is the same as that of the first stopper mechanism 10L, the same symbols are attached to the same component parts, and the description thereof is omitted.

In this example, the wedge-like spaces 20 of the first stopper mechanism 10L and the second stopper mechanism 10R are arranged in the central portion of the stopper body 30, so that their narrow gap sides are in opposition to each other, whereas those sides of the wedge-like spaces 20 at which the gaps are wide are in mutually opposite directions, i.e., located at the end sides of the stopper body 30.

In addition, in this embodiment, release mechanisms 70 acting as rolling element release means are provided which serve to force the rollers 40, 40 arranged in the wedge-like spaces 20, 20 of the first stopper mechanism 10R and the second stopper mechanism 10L to move in directions in which the gap in each wedge-like space 20 becomes larger, whereby the stopper body 30 is allowed to move relative to the guide member 100 toward a side at which the gaps in the wedge-like spaces 20, 20 are larger.

These release mechanisms 70 are each of a construction including a pressing member 71 that is arranged to be insertable and removable from the outside of the stopper body 30 in a direction orthogonal to the extending direction of the guide member 100, and a spring 72 that urges the pressing member 71 in a direction to move away from the stopper body 30. The pressing member 71 is formed at its inner tip end with a pressing head 73 which is movable toward and away from the individual roller retainers of the first stopper mechanism 10R and the second stopper mechanism 10L, respectively, and the pressing member 71 is formed at its outer end with a button part 74 for pressing it down with a finger. A connection pin connecting the button part 74 and the pressing head 73 with each other is inserted in a pin hole formed in the stopper body 30.

The pressing head 73 has a conical shape inclined or tapered to become thinner toward its tip, with its inclined or tapered surface being in abutment with the individual roller retainers 80 of the first stopper mechanism 10R and the second stopper mechanism 10L, wherein by pushing in the pressing member 71 against the spring force of the spring 72, the roller retainers 80 are forced to move in directions away from each other, i.e., the individual rollers 40 arranged in the wedge-like spaces 20, 20 of the first and second stopper mechanisms 10L, 10R are forced to move in directions in which the gaps in the wedge-like spaces 20, 20 become larger, whereby it is made possible for the stopper body 30 to move with respect to the guide member 100 to a side at which the gap in either of the wedge-like spaces 20, 20 becomes larger, i.e., in this example, to the opposite sides of the extending direction of the guide member 100.

With the linear stopper 1 of the above-mentioned construction, in a state where it is removed from the guide member 100, the roller retainers 80 are engaged with the guide grooves 32 in the stopper body 30, respectively, so that the rollers 40 are supported by the stopper body 30 through the roller retainers 80.

Then, in a state where the pressing members 71 are pushed in, the inner periphery of the stopper body 30 is caused to move from one end of the guide member 100 up to an appropriate position of the guide member 100. The roller retainers 80 of the first stopper mechanism 10L and the second stopper mechanism 10R are moved in directions mutually away from each other by means of the pressing heads 73, with the pressing members 71 being pushed in, so that the individual rollers 40 in the first and second stopper mechanisms 10L, 10R slide on the surface of the guide member 100, and move to their predetermined positions, without biting into the wedge-like spaces 20, 20.

When a hand is removed from each pressing member 71, the individual roller retainers 80, 80 are urged in directions to bite into the wedge-like spaces 20, 20 by means of the individual pressing springs 50, 50 of the first and second stopper mechanisms 10L, 10R, respectively, so that the rollers 40, 40 are pushed against the side surface of the guide member 100 and the inclined surfaces 21, 21 in the wedge-like spaces 20, 20, respectively.

In this state, even if the stopper body 30 is to be moved with respect to the guide member 100 in either side of the extending direction of the guide member 100, the rollers 40 in either of the first and second stopper mechanisms 10L, 10R will bite into any of the wedge-like spaces 20 due to rolling contact therebetween, and the relative movement of the stopper body 30 will be restricted.

Then, in cases where the guide member 200 is caused to move again, by pushing in the pressing members 71 of the release mechanisms 70, the biting of the rollers into the wedge-like spaces 20 is released, thus making it possible for the rollers to move freely in either direction. Releasing of the rollers is easy because of biting of the rollers 40.

Here, note that there has been shown, by way of example, a case in which cylindrical rollers are used as the rolling elements used for the above-mentioned linear stopper, balls may instead be used, and in cases where the present invention is applied to a rail of a circular cross section as a guide member, rollers in the shape of a barrel may be used, and thus, the shape of the rolling elements is not limited.

In addition, although in the above-mentioned embodiments, the first stopper mechanism 10L and the second stopper mechanism 10R are arranged in the same phase in the circumferential direction, the phases in the circumferential direction of the first stopper mechanism 10R and the second stopper mechanism 10R may be different from each other.

Moreover, although in the above-mentioned embodiments, a reaction force acting on the inclined surfaces 21 of the stopper body 30 from the rolling elements is supported by the inner surface of the stopper body in contact with the side surface of the guide member 100, but instead, a reaction force of one of the bidirectional stopper mechanisms at one side can be supported by the other bidirectional stopper mechanism located at an opposed side of the guide member, so that the bidirectional stopper mechanisms themselves may serve as reaction force support parts.

In addition, the wedge-like spaces of the first stopper mechanism 10R and the second stopper mechanism 10L are arranged in such a manner that their narrow gap sides are in opposition to each other in the central portion of the stopper body 30, but on the contrary, they may also instead be arranged in such a manner that those sides of the wedge-like spaces at which the gaps are wide are in mutual opposition to each other in the central portion of the stopper body 30.

Moreover, although in the above-mentioned embodiment, it is constructed such that movements of the guide member 100 to the opposite sides of the extending direction thereof are restricted, the construction may also instead be such that only the movement of the guide member 100 to one side of the extending direction is restricted by means of only a one-way stop mechanism at one side.

EXPLANATION OF REFERENCE NUMERALS
AND CHARACTERS 1 linear stopper
10 bidirectional stopper mechanism
10L first stopper mechanism
10R second stopper mechanism
20 wedge-like spaces
21 inclined surfaces
30 stopper body
30A half body
30B half body
31 holes
32 guide grooves
40 rollers
70 release mechanisms
71 pressing members
72 springs
73 pressing heads
74 button parts
80 roller retainers
81 retaining holes 81a front and rear end edges
90 pressing plates
100 guide member
101, 102, 103,
104, 105 side surfaces
304, 305 inner surfaces (reaction force support parts)F

What is claimed:

1. A linear stopper comprising:
    a stopper body that is adapted to detachably mounted on a guide member extending in a linear manner so as to guide an object for reciprocating movement, and has an inclined surface formed thereon, with a wedge-like space being constructed between the inclined surface and a surface of the guide member with a gap decreasing gradually toward one side of an extending direction of the guide member;
    rolling elements that are arranged in said wedge-like space so as to be rollable therein; and
    rolling element pressing means that presses the rolling elements in a direction to bite into the wedge-like space, so that the rolling elements are forced into pressure contact with the surface of the guide member and the inclined surface of the stopper body;
    wherein a one-way stopper mechanism is provided which restricts the relative movement of the stopper body with respect to said guide member toward a side at which the gap in the wedge-like space is large, due to a biting action caused by the rolling contact of the rolling elements in said wedge-like space, and allows the relative movement of the stopper body with respect to said guide member toward a side at which the gap in the wedge-like space is small, due to the sliding contact of the rolling elements in said wedge-like space,
    wherein the rolling element is a roller which is provided with a central concave surface portion of which a cross sectional configuration cut by a surface passing through a roller central axis is an arcuate concave shape and end convex surface portions which continue to the axially opposite sides of the central concave surface portion, and of which a cross sectional configuration cut by a surface passing through the roller central axis is an arcuate convex shape, and
    a radius of a contact portion of the central concave surface portion in contact with the guide from the roller central axis, and a radius of the opposite contact stopper body of the opposite end convex surface portions in contact with the stopper body from the roller central axis are set to the same radius.

2. A linear stopper as set forth in claim 1, further comprising: rolling element release means that serves to force the rolling elements arranged in the wedge-like space to move in a direction in which the gap in the wedge-like space becomes larger, whereby the stopper body is allowed to move relative to said guide member toward the side at which the gap in the wedge-like space is larger.

3. A linear stopper as set forth in claim 2, wherein the rolling element release means comprises an air expansion and contraction mechanism which can be expanded and contracted by supplying air pressure to the interior of the air expansion.

4. The linear stopper as set forth in claim 2, wherein the rolling element release means comprises an operation part which has pressing plates arranged at the axially opposite end sides of the stopper body.

5. The linear stopper as set forth in claim 2, wherein the rolling element release means comprises an operation part which has a lever arranged at the stopper body.

6. The linear stopper as set forth in claim 2, wherein the rolling element release means comprises an operation part which has an operation ring fitted in a rotatable manner to an outer periphery of the stopper body.

7. A linear stopper as set forth in claim 1, further comprising:
    at least one pair of one-way stopper mechanisms in which the directions of wedge-like spaces with respect to the guide member become mutually opposite to each other, so that the relative movement of the stopper body with respect to the guide member to the opposite sides of an extending direction of the guide member can be restricted; and
    rolling element release means that serves to force the rolling elements arranged in the wedge-like space of at least one of the one-way stopper mechanisms to move in a direction in which the gap in the wedge-like space becomes larger, whereby the stopper body is allowed to move relative to said guide member toward the side at which the gap in the wedge-like space is larger.

8. A linear stopper as set forth in claim 7, wherein the rolling element release means comprises an air expansion and contraction mechanism which can be expanded and contracted by supplying air pressure to the interior of the air expansion.

9. The linear stopper as set forth in claim 7, wherein the rolling element release means comprises an operation part which has pressing plates arranged at the axially opposite end sides of the stopper body.

10. The linear stopper as set forth in claim 7, wherein the rolling element release means comprises an operation part which has a lever arranged at the stopper body.

11. The linear stopper as set forth in claim 7, wherein the rolling element release means comprises an operation part which has an operation ring fitted in a rotatable manner to an outer periphery of the stopper body.

* * * * *